United States Patent
Reeder et al.

(10) Patent No.: US 10,410,428 B1
(45) Date of Patent: *Sep. 10, 2019

(54) PROVIDING TECHNICAL SUPPORT IN AN AUGMENTED REALITY ENVIRONMENT

(71) Applicant: Noble Systems Corporation, Atlanta, GA (US)

(72) Inventors: Lewis J. Reeder, Cumming, GA (US); Christopher S. Haggerty, Atlanta, GA (US)

(73) Assignee: Noble Systems Corporation, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/437,140

(22) Filed: Jun. 11, 2019

Related U.S. Application Data

(63) Continuation of application No. 15/993,033, filed on May 30, 2018.

(51) Int. Cl.
| | |
|---|---|
| *G06T 19/00* | (2011.01) |
| *G06Q 30/00* | (2012.01) |
| *G06K 9/00* | (2006.01) |
| *G06T 7/00* | (2017.01) |
| *G06F 3/0481* | (2013.01) |
| *G06K 9/62* | (2006.01) |

(52) U.S. Cl.
CPC ........ *G06T 19/006* (2013.01); *G06F 3/04815* (2013.01); *G06K 9/00671* (2013.01); *G06K 9/6278* (2013.01); *G06Q 30/016* (2013.01); *G06T 7/001* (2013.01)

(58) Field of Classification Search
None
See application file for complete search history.

(56) References Cited

U.S. PATENT DOCUMENTS

| | | | |
|---|---|---|---|
| 8,666,652 | B2 | 3/2014 | Short |
| 2007/0217676 | A1 | 9/2007 | Grauman et al. |
| 2011/0182469 | A1 | 7/2011 | Ji et al. |
| 2014/0368980 | A1 | 12/2014 | Nanavati et al. |
| 2015/0146007 | A1 | 5/2015 | Dusik et al. |
| 2015/0156028 | A1 | 6/2015 | Ballard et al. |

(Continued)

OTHER PUBLICATIONS

3D Convolutional Neural Networks for Human Action Recognition, Ji, Shuiwang, Xu, Wei, Yang, Ming, and Yu, Kai, Proceedings of the 27th International Conference on Machine Learning, Haifa, Israel, 2010.

(Continued)

*Primary Examiner* — David H Chu

(57) ABSTRACT

Various embodiments of the invention provide methods, systems, and computer program products for providing support to a party who is using an augmented reality device and seeking to resolve an issue. One or more pieces of information are obtained through the augmented reality device and a cause of the issue is identified by utilizing one or more predictive models and the pieces of information as input to the models. Once the cause has been identified, a script is queried that includes instructions to be performed by the party to address the cause and media to execute on the augmented reality device to aid the party in performing the instructions. Accordingly, the instructions and media are communicated to the party through the augmented reality device so that the party may perform the instructions with the aid of the media to address the cause of the issue.

18 Claims, 19 Drawing Sheets

(56) References Cited

U.S. PATENT DOCUMENTS

| | | | |
|---|---|---|---|
| 2016/0228771 A1 | 8/2016 | Watson | |
| 2016/0307459 A1 | 10/2016 | Chestnut et al. | |
| 2017/0186157 A1 | 6/2017 | Boettger et al. | |
| 2017/0213390 A1 | 7/2017 | Ramachandran et al. | |
| 2017/0301261 A1 | 10/2017 | Robitzkat et al. | |
| 2017/0352282 A1 | 12/2017 | Anderson et al. | |
| 2017/0365101 A1 | 12/2017 | Samec et al. | |
| 2018/0061255 A1 | 3/2018 | Ekambaram et al. | |
| 2018/0131907 A1 | 5/2018 | Schmirler et al. | |
| 2018/0150791 A1 | 5/2018 | Stansell et al. | |

OTHER PUBLICATIONS

A Survey of Image Quality Measures, Thung, Kim-Han and Raveendran, Paramesran, Dept. of Electrical Engineering, IEEE Xplore, Jan. 2010.
Convolutional Neural Networks (CNNs/ConvNets), Karpathy, Andrei, http://cs231n.github.io/convolutional-networks/, Jan. 1, 2015.
Deep Residual Learning for Image Recognition, He, Kaiming, Zhang, Xiangyu, Ren, Shaoqing, and Sun, Jian, Microsoft Research, Dec. 10, 2015.
Statistical Evaluation of No-Reference Image Quality Assessment Metrics for Remote Sensing Images, Li, Shuang, Yang, Zewei, and Li, Hongsheng, ISPRS Int. J. Geo-Int. 2017, 6, 133.
Two-Stream Convolutional Networks for Action Recognition in Videos, Simonyan, Karen and Zisserman, Andrew, Visual Geometry Group, University of Oxford, Nov. 12, 2014.
Very Deep Convolutional Networks for Large-Scale Image Recognition, Simonyan, Karen and Zisserman, Andrew, Visual Geometry Group, Department of Engineering Science, University of Oxford, Apr. 10, 2015.

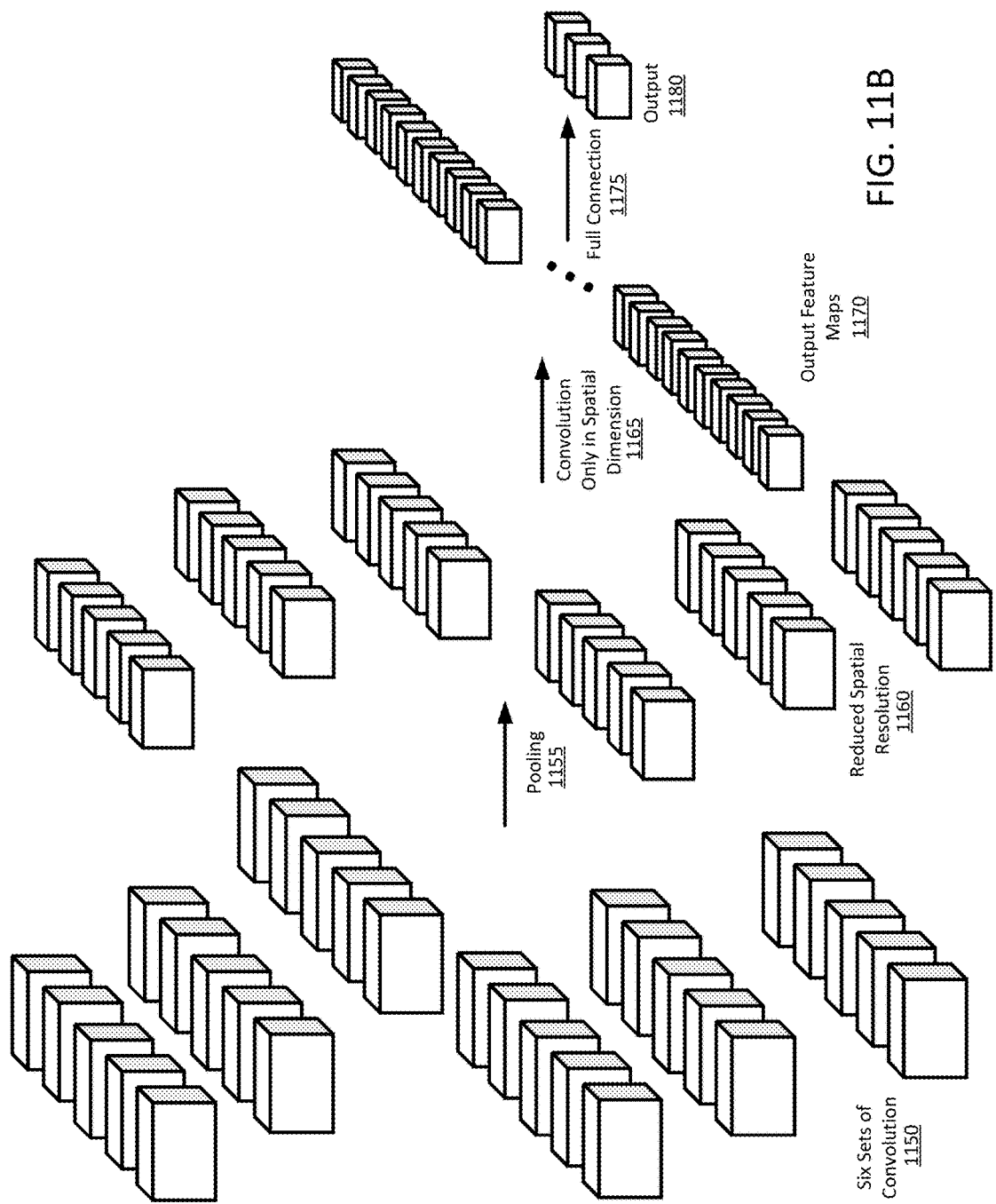

Convolutional Neural Networks (ConvNets)
1. Image model with two classifications: (1) derailleur hanger is aligned and (2) is misaligned.
2. Image model with two classifications: (1) cassette is worn and (2) is not worn.
3. Image model with two classifications: (1) chainrings are worn and (2) are not worn.
4. Action model with two classifications: (1) movement of cogs skipping as shifting to lower gears and (2) no movement of cogs skipping as shifting to lower gears.
5. Action model with two classifications: (1) movement of cogs skipping as shifting to higher gears and (2) no movement of cogs skipping as shifting to higher gears.
6. Action model with two classifications: (1) movement of shifting getting stuck as shifting to lower gears and (2) no movement of shifting getting stuck as shifting to lower gears.
7. Action model with two classifications: (1) movement of shifting getting stuck as shifting to higher gears and (2) no movement of shifting getting stuck as shifting to lower gears.
8. Action model with two classifications: (1) slow movement of shifting to higher gears and (2) no slow movement of shifting to higher gears.
9. Action model with two classifications: (1) movement of chain dropping off the cassette towards the spokes and (2) no movement of chain dropping off the cassette towards the spokes.
10. Action model with two classifications: (1) movement of chain dropping off the cassette away from the bike and (2) no movement of chain dropping off the cassette away from the bike.
11. Action model with two classifications: (1) movement of front derailleur shifting roughly and (2) no movement of front derailleur shifting roughly.

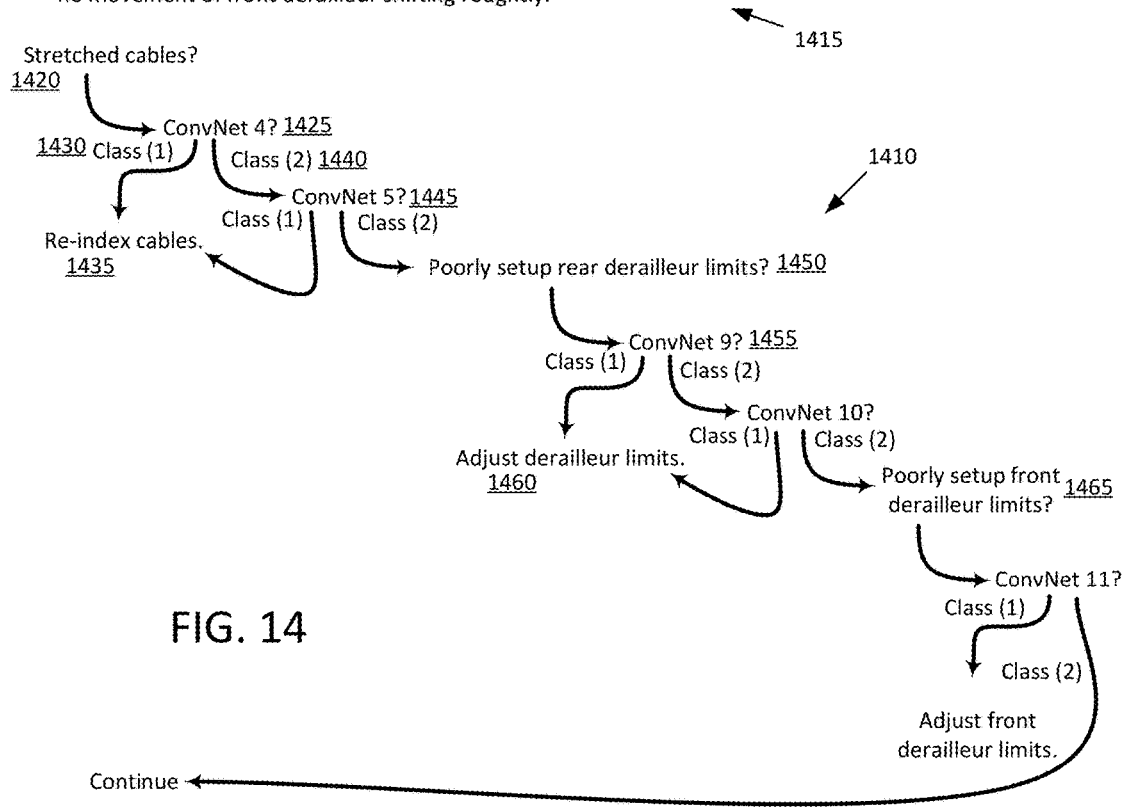

FIG. 14

PROVIDING TECHNICAL SUPPORT IN AN AUGMENTED REALITY ENVIRONMENT

CROSS REFERENCE TO RELATED APPLICATIONS

This application is a continuation of U.S. patent application Ser. No. 15/993,033, filed on May 30, 2018, of which the entire contents are incorporated by reference for all that they teach.

BACKGROUND

Technical support generally refers to a range of services by which enterprises provide assistance to parties who are having an issue. For example, many technology vendors (e.g., computer manufacturers) provide technical support that purchasers of their technology can contact to obtain help with issues the purchasers are having with their technology. Traditionally, technical support has been provided over the telephone, online by email, over a web chat, or via a website a party who is seeking support can visit.

However, the problem with such approaches is that the two parties (e.g., the party seeking technical support and the enterprise providing the technical support) are remote from one another. Therefore, the enterprise providing the support (e.g., the agent) has to rely on the party's description of the issue. This can prove to be a big hindrance if the party seeking the support cannot describe the issue and/or his environment accurately. One way to overcome this problem is for the enterprise to have personnel who can serve as on-site technical support. These are individuals who actually travel to the party's location to help the party with his or her issue. However, such support is much more costly than providing support remotely.

Therefore, a need exists in the relevant art for a solution that allows for enterprises to provide technical support remotely, but that also overcomes the barrier of having parties who seek support to solely provide information about the issues they are having and/or their environments accurately. It is with respect to these considerations and others that the disclosure herein is presented.

SUMMARY

In general, embodiments of the present invention provide computer program products, methods, systems, apparatus, and computing entities for providing support to a party who is using an augmented reality device and seeking to resolve an issue. For instance, in various embodiments, the issue the party who is using the augmented reality device is seeking to resolve is received. For example, the party may be having an issue with shifting the gears on his bicycle that the party is seeking help in resolving.

In response, one or more pieces of information needed to identify a cause of the issue are obtained from the augmented reality device. Here, the one or more pieces of information may include (1) an image of a real world, physical object photographed by a camera coupled to the augmented reality device, (2) a video of a real world, physical object recorded by the camera coupled to the augmented reality device, (3) a physical sound recorded through a microphone on the augmented reality device, and/or (4) input provided by the party on an input element on the augmented reality device. In particular embodiments, a request to access the party's augmented reality device may be initially sent so that the one or more pieces of information can be obtained.

Accordingly, the cause of the issue the party is having is identified by utilizing one or more predictive models and the one or more pieces of information obtained from the augmented reality device as input to the predictive models. For example, in particular embodiments, the one or more predictive models include one or more of a decision tree, a support vector machine, Bayesian network, clustering, reinforcement learning, and neural network. Here, in various embodiments, the one or more predictive models are arranged in a hierarchical program structure to provide an order in which the predictive models are utilized for identifying the cause of the issue.

Once the cause of the issue has been identified, a script is queried for the identified cause that includes one or more instructions to be performed by the party to address the cause of the issue and one or more pieces of media to execute on the augmented reality device to aid the party in performing the one or more instructions. For example, depending on the script, the one or more pieces of media may include (1) an image to be displayed on a display of the augmented reality device, (2) a video to be displayed on the display of the augmented reality device, and/or (3) a sound to be played over a speaker coupled with the augmented reality device.

At this point, the one or more instructions and the one or more pieces of media are communicated to the party through the augmented reality device so that the party may perform the instructions with the aid of the media executed on the augmented reality device to address the cause of the party's issue. In addition, in particular embodiments, location information may be communicated to the party's augmented reality device identifying where to place one or more instructions and/or the one or more pieces of media on a display of the augmented reality device so that the one or more instructions and/or the one or more pieces of media are superimposed over a field of view of the party in one or more positions with respect to at least one physical object viewable in the field of view of the party.

Depending on the embodiment, the one or more instructions may be communicated to the party one at a time in which a determination is made as to whether an instruction communicated to the party was performed correctly. If so, then a next instruction is communicated to the party to perform and so forth. However, if the instruction was not performed correctly, then the instruction is communicated to the party again so that the party can re-perform the instruction correctly.

This Summary is provided to exemplify concepts at a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE DRAWINGS

Reference will now be made to the accompanying drawings, which are not necessarily drawn to scale, and wherein:

FIGS. 11A and 11B illustrate another architecture for convolutional neural networks that may be used in accordance with various embodiments of the present invention.

FIG. 14 illustrates a hierarchical program structure used for addressing a bicycle gear shifting issue in accordance with various embodiments of the present invention.

DETAILED DESCRIPTION

Figure 1:
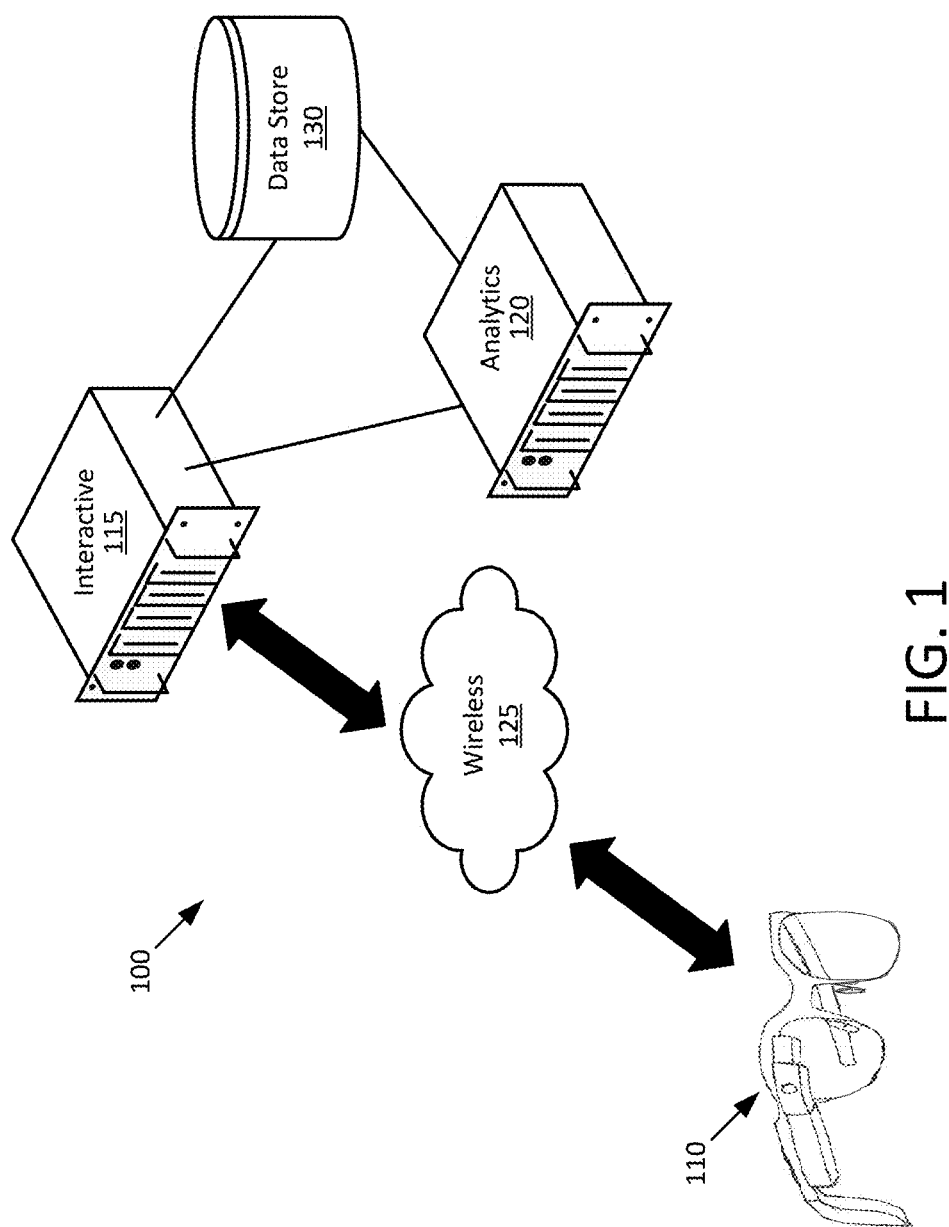
FIG. 1 illustrates an architecture of various components of a system that may be used in accordance with various embodiments of the present invention.

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

Exemplary System Architecture

FIG. 1 illustrates a system architecture 100 that may be used in accordance with the various technologies and concepts disclosed herein. The architecture 100 includes an augmented reality device 110 and an interactive component 115 that is remote from the augmented reality device 110. For instance, the party may be engaged in some activity while using the device 110 and may need technical assistance with respect to the activity. For example, the party may be installing computer equipment in a first location, such as his home, and may need assistance in setting up the equipment to communication with each other. Here, in particular embodiments, the party may obtain the needed assistance by using the augmented reality device 110 to communicate with the interactive component 115 residing at a remote, second location. Here, the remote, second location may be any suitable location for hosting the interactive component 115. For instance, in particular embodiments, the remote, second location is a contact center or some other venue associated with a particular business or entity. Accordingly, the party can perform tasks/operations that are communicated to him through the device 110 from the interactive component 115 located at the remote, second location to assist him in installing the computer equipment.

In FIG. 1, the augmented reality device 110 is eyewear, such as Google Glass®, configured to capture audio and visual data during a time the device 110 is being worn by the party. Here, the device 110 may be worn in such a way that it is supported by the head of the party, leaving the party's hands free to perform instructions supplied to the party. In other instances, the augmented reality device 110 may be some type of handheld device, such as a smartphone or tablet, with an application installed on the device to enable it to operate in an augmented reality environment.

In general, the augmented reality device 110 includes a digital display that can be positioned in the party's field of view. For example, the digital display may be implemented within or on the lens of the device 110 as eyewear having a see-through field-of-view. While in another example, the digital display may be implemented on the touch screen of a handheld device 110 that the party holds up in his or her field of view that is visible through a camera lens. The digital display of the device 110 may view and control items shown on the display. That is to say, the digital display may be an augmented reality display that projects media over real world, physical objects. For example, the party wearing the device 110 as eyewear may be capable of seeing the digital display overlaying the real world visible to the party through the lens.

The device 110 may also include a camera configured to capture visual data (e.g., an image or video) from the perspective of the party using the device 110. That is, a camera configured to capture visual data from the vantage point seen by the party. The device 110 may also include a speaker and/or a microphone to communication audio to and/or capture audio from the party using the device 110. The speaker may provide instructions to the party in the form of audio. While the microphone may capture speech from the party, ambient (environmental) sounds, and the like.

Further, the device 110 may include one or more user input elements configured to provide control signals triggered by input from the party. For instance, one input element may be a touch pad configured to detect motions from a finger in contact with the pad that interprets the motions as control signals from the party. For example, the party may select a desired item from a list displayed on the digital display by swiping his finger down on the touch pad to scroll through the items on the list and tapping on the touch pad to select the desired item.

In another instance, an input element may be voice commands provided by the party speaking into the microphone of the device 110. For example, the party may say "take photo" that indicates to the device 110 to capture an image of the current view of the party. Those skilled in the art may appreciate other input elements that may be utilized for controlling the augmented reality device 110, such as a gesture command, compass, light sensor, location/GPS sensor, gyroscope, a tactile button, and the like.

Finally, the device 110 may include a non-transitory computer-readable memory and one or more processors. In these particular embodiments, the processor(s) may be configured to communication with the digital display, camera, speaker, input element(s), and/or memory. While the memory of the device 110 in particular embodiments may have computer-executable instructions stored therein that the processor(s) execute to perform various operations described herein. Depending on the embodiment, these instructions may be provided by downloading an application (an "app") to the device 110 or the device 110 may be pre-programmed with the instructions.

In various embodiments, the augmented reality device 110 is configured to transmit and received information to and from the interactive component 115 in a live, real-time manner. For instance, in particular embodiments, audio and visual information is streamed between the device 110 and the interactive component 115. Here, the audio information may comprise any suitable recording, artificial voice, etc. and the visual information may comprise any suitable image, photo, video, animation, graphic, etc. For example, the interactive component 115 may interact with the party using the device 110 by streaming visual information to the device 110 that is displayed in the field-of-view of the party. In addition, the augmented reality device 110 and interactive component 115 are in communication with one another over some type of network 125, such as a wireless network. Depending on the embodiment, the network 125 may be any suitable network that enables wireless communication between the augmented reality device 110 and the interactive component 115 such as Wi-Fi, cellular, cloud-based, or other.

As is discussed in further detail herein, the interactive component 115 is also in communication with an analytics component 120 in various embodiments. Here, the analytics component 120 is configured to analyze and/or evaluate information obtained from the augmented reality device 110 to attempt to identify a cause of an issue (problem) being encountered by the party using the device 110 and/or to identify instructions to be provided to the party to aid in addressing the issue the party has contacted the interactive component 115 (technical support).

Furthermore, the interactive component 115 and/or analytics component 120 may be in communication with one or more types of storage media 130 that stores information produced or used by these components 115, 120. For instance, in particular embodiments, the storage media 130 is used to store different scripts that include instructions and/or media that are to be provided to the party using the augmented reality device 110 to be executed in order to perform some type of task. In addition, in particular embodiments, the storage media 130 may be used to store various workflows and/or predictive models that are used in identify causes of issues being encountered by the party using the augmented reality device 110. Finally, the storage media 130 may be used to store visual and audio information provided by the party.

Each of the above components may be referred to in the art as a "server," "computing device," "processing system," "unit," or "system." A component may incorporate a local data store, as well as interface with an external data store. Use of the word "server" does not require a component to interact in a client-server arrangement with other components, although that may be the case. Further, the above components may be located remotely from (or co-located with) other components. Furthermore, one or more of the components may be implemented on a single processing device to perform the functions described herein. For example, in various embodiments, one or more functionalities of the interactive component 115 and the analytics component 120 may be combined into a single hardware platform executing one or more software modules. In addition, there is no requirement that the components identified above actually be located or controlled by a particular entity such as a contact center. Accordingly, those skilled in art will recognize FIG. 1 represents one possible configuration of a system architecture 100, and that variations are possible with respect to the protocols, facilities, components, technologies, and equipment used.

Exemplary System Operation

The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

Interactive Module

Figure 2:
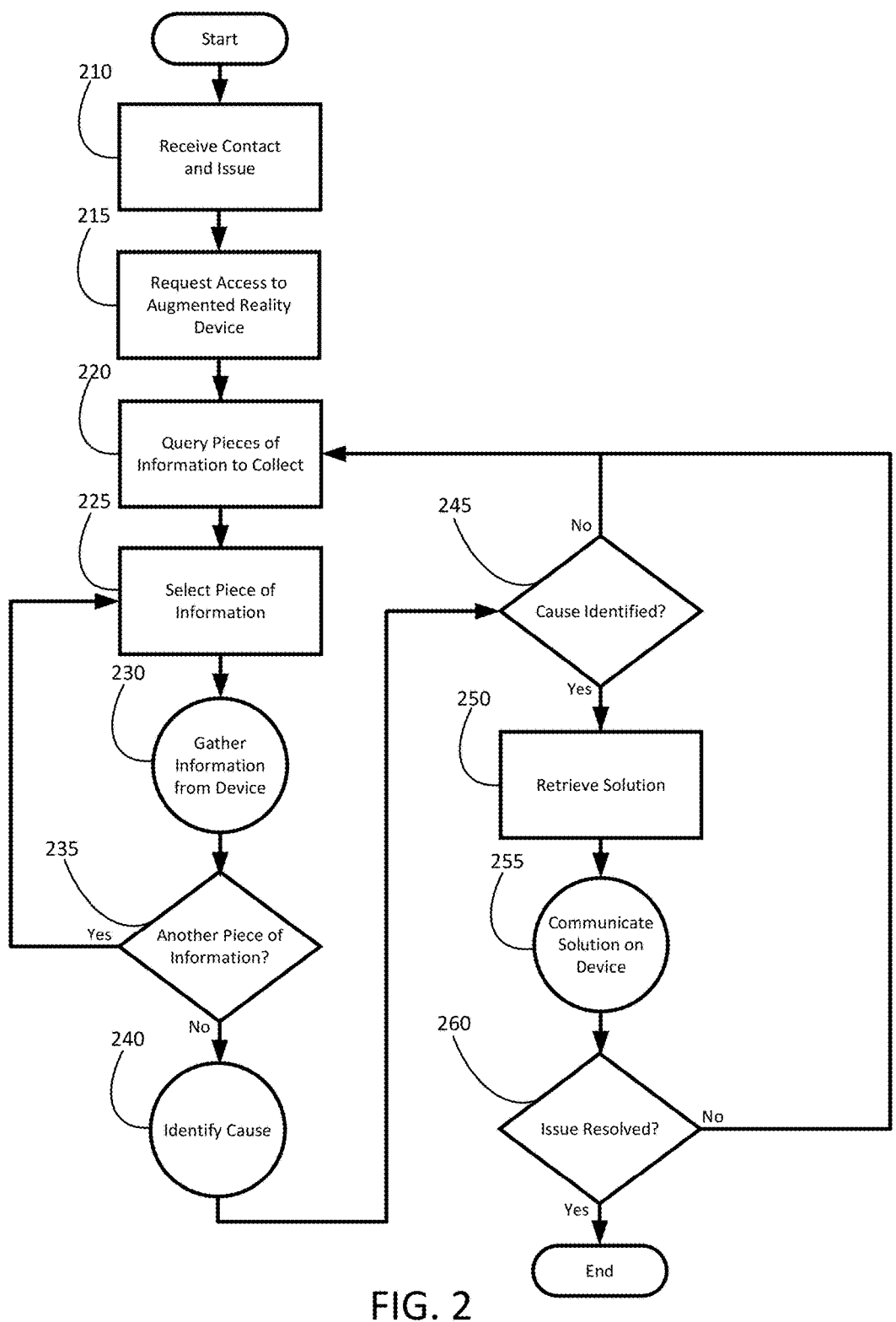
FIG. 2 illustrates a process flow for providing technical support in an augmented reality environment in accordance with various embodiments of the present invention.

Turning now to FIG. 2, additional details are provided regarding a process flow for providing technical support in an augmented reality environment according to various embodiments of the invention. In particular, FIG. 2 is a flow diagram of an interactive module for performing such functionality according to various embodiments of the invention. For example, the flow diagram shown in FIG. 2 may correspond to operations carried out by one or more processors in one or more components, such as the interactive component 115 described above, as it executes the interactive module stored in the component's volatile and/or non-volatile memory.

The process flow begins in FIG. 2 with the interactive module being invoked and receiving a contact in Operation 210 from a party who is seeking technical support for an issue and is using an augmented reality device 110. For instance, in particular embodiments, the augmented reality device 110 may have an application (an "app") installed on the device that the party activates to communicate over a wireless network 125 with a remote location (the interactive component 115) that can provide technical support. While in other embodiments, the party may instead navigate to a website associated with the remote location by using a browser installed on the augmented reality device 110.

In turn, the app or website initially identifies an issue the party is having for which the party is in need of technical support. Depending on the embodiment, the app or website may go about identifying the issue the party is having in different ways. For instance, the app or website may provide a list of issues that is displayed to the party from which the party selects an issue from the list. While in another instance, the party may be asked one or more questions to help identify an issue. Those of ordinary skill in the art can envision multiple approaches that may be used in identifying the issue for the party in light of this disclosure.

Accordingly, the interactive component 115 receives a request for assistance and the identified issue from the party using the augmented reality device 110 and invokes the interactive module (or an instance thereof) and provides the module with a contact for the party along with the issue. Generally speaking, the contact furnishes an identity for the source of the request that being the augmented reality device 110 used by the party, so that the interactive module can stream information to and from the augmented reality device 110 to communication with that party.

An example of an issue is now provided to help further facilitate discussion of the remaining operations of the interactive module. This example is to help the reader better comprehend the operations of the interactive module (and other modules discussed herein) and should not be construed to limit the scope of the invention in any way. In this instance, a party has a bicycle that is not shifting correctly. The party is not an experienced bicycle mechanic and is not sure how to fix the shifting problem. However, the party has installed an app on his augmented reality device 110 named "Fix your bike" that provides instructions on bike maintenance and how to fix common problems. Therefore, the party invokes the app on his device 110 and a listing of issues are provided on the display of the device 110 for the party to choose from. The party scrolls through the listing and finds the issue "bike not shifting properly." He selects the issue and a request is sent from his augmented reality device 110 over a wireless network 125 to the interactive component 115. In turn, the interactive component 115 invokes the interactive module and provides the contact for the party and the issue.

At this point, the interactive module in various embodiments requests access to the party's augmented reality device 110 in Operation 215. Here, the interactive module requests access so that the module may be able to control certain aspects of the device 110 to aid in collecting needed information as well as providing information to the device 115. For instance, the interactive module may want to display an image on the party's augmented reality device 110 to assist the party in performing some type of task and having access to the party's device 110 allows the interactive module to display the image on the device 110.

Continuing, the interactive module next gathers needed information from the party's augmented reality device 110 that can be used to provide the party with technical support. Accordingly, the interactive module queries what pieces of information to collect for the identified issue in Operation 220. For instance, in particular embodiments, the information that needs to be collected for the identified issue may be stored in some type of storage media 130 that the interactive module queries based on the identified issue. Next, the interactive module selects a piece of information that needs to be collected from the queried information in Operation 225.

At this point, the interactive module gathers the piece of information from the party in Operation 230. Accordingly, the interactive module performs this operation in particular embodiments by invoking an information collecting module that is configured to acquire the needed piece of information from the party. The information collecting module collects the needed piece of information and saves the information so that it is available for use in assisting the party. At this point, the interactive module determines whether another piece of information needs to be gather from the party in Operation 235. If so, then the interactive module returns to Operation 225 and selects the next piece of information needed to be gathered from the party.

For instance, returning to the example involving the bicycle not shifting correctly, the needed pieces of information may entail: (1) an image of the rear-view of the derailleur hanger aligned with the cassette and through the upper and lower jockey-wheels; (2) an image of the side of the cassette; (3) a video of the cassette while one-click shifting up to the largest cog; and (4) a video of the cassette while one-click shifting down to the smallest cog. Therefore, the interactive module invokes the information collecting module for each piece of information needed to be gathered from the party and the information collecting module goes about the task of having the party take a picture of the rear-view of the derailleur hanger aligned with the cassette, a picture of the side of the cassette, a video of the cassette while the party one-click shifts up to the largest cog, and a video of the cassette while the party one-click shifts down to the smallest cog by utilizing the party's augmented reality device 110. Once the images and videos have been received from the party's augmented reality device 110, the images and videos are saved by the information collecting module.

Once the needed information has been gathered from the party, the interactive module identifies a cause for the issue being experienced by the party in Operation 240. Similarly, the interactive module performs this operation in particular embodiments by invoking a cause module that is configured to determine a cause of the party's issue based on the collected information. As further detailed herein, the cause module goes about this task in various embodiments by making use of a hierarchical program structure, predictive models, and the information gathered from the party. For instance, in the example, the cause module may determine based on the images and videos collected from the party that the cause of the poor shifting is the derailleur hanger is misaligned, the cassette is worn, or the derailleur limits are poorly setup.

At this point, the interactive module determines whether a cause was identified in Operation 245. If not, then the interactive module may return to Operation 220 to gather further information from the party. However, if a cause was identified, then the interactive module retrieves a solution for the cause of the issue in Operation 250. Here, in various embodiments, the solution is a script that includes instructions and/or media that can be provided to the party through his augmented reality device 110 so that the party can perform various tasks to try and resolve the issue.

Thus once retrieved, the interactive module communicates the solution to the party through the party's augmented reality device in Operation 255. In various embodiments, the interactive module performs this operation by invoking a script module that is configured to provide the instructions and/or media of the script for the solution to the party. As a result, the physical real-world environment the party is experiencing is augmented by computer-generated perceptual information across one or more sensory modalities, such as visual, auditory, haptic, somatosensory, and olfactory. Such augmentation helps to enhance the party's physical environment and offer perceptually enriched experiences that facilitates the party's understanding of the solution presented to the party and the party's execution of various instructions/tasks associated with the solution to address the cause of the party's issue.

To illustrate, returning to the example involving the party with a bicycle having a shifting issue, the cause for the shifting issue may have been identified as the derailleur hanger is misaligned (bent) with respect to the cassette. Here, the solution may entail instructing the party to straighten the derailleur hanger so that the hander is aligned with the cassette. Therefore, the script for the solution may include providing an image on the display of the party's augmented reality device 110 that explains the cause of the party's issue is a misaligned derailleur hanger. The script may further include an instruction for the party to realign the derailleur hanger with the cassette by bending the hanger into the proper position. This instruction may be provided to the party as an image of text on the display of the party's augmented reality device 110 and/or as audio played over the speaker of the party's augmented reality device 110. In addition, the script may further include an image that is superimposed on the party's field of view that points out the derailleur hanger on the party's bike. Further, the script may also instruct the party to view the derailleur hanger from the rear and then superimpose a direction line with respect to the derailleur hanger to guide the party in bending the hanger into the proper position.

Figure 3:
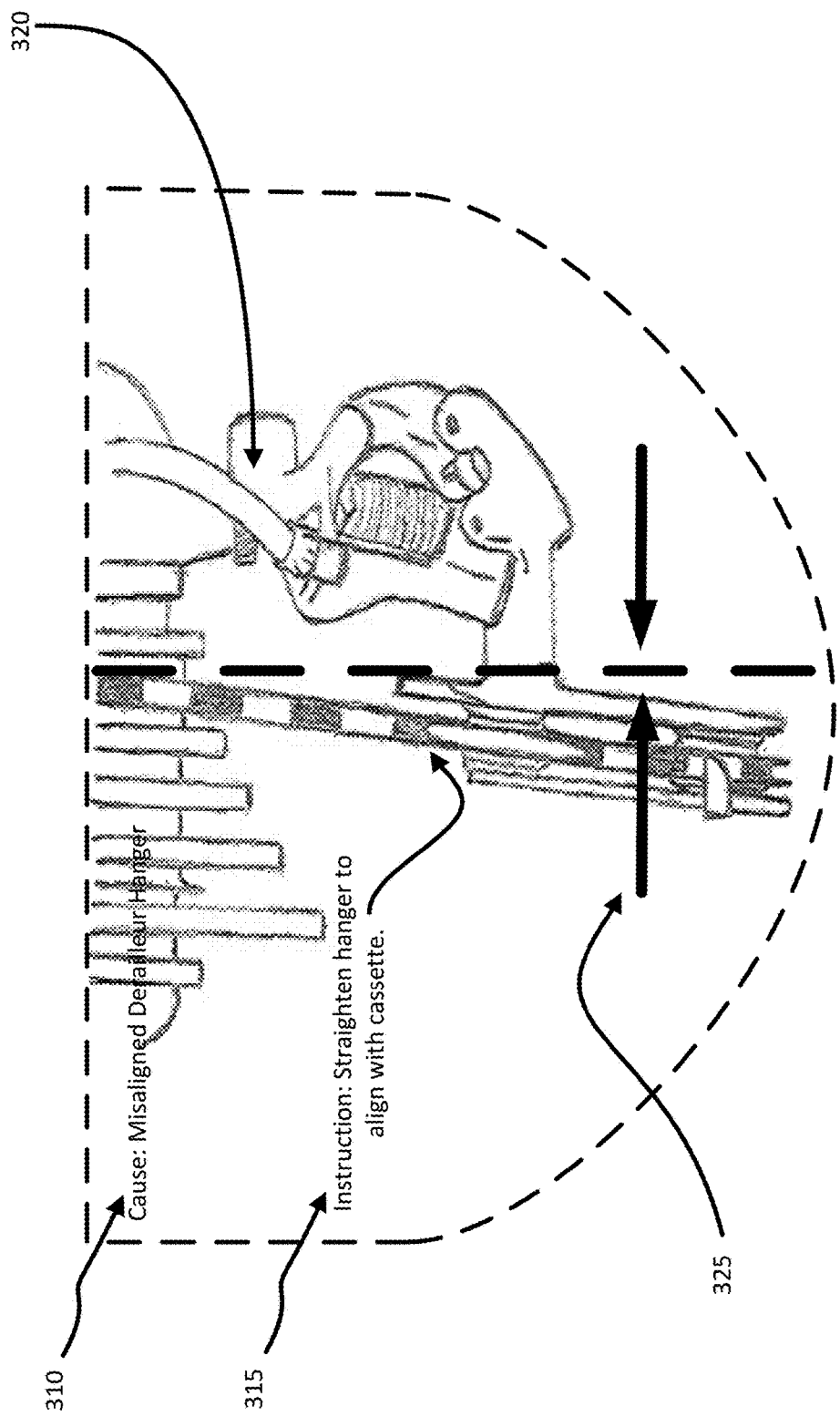
FIG. 3 is a first example view of one lens of an augmented reality device from the perspective of a wearer of the device resulting from practicing various embodiments of the present invention.

An example of the party's view through one of the lens of his augmented reality device 110 is shown in FIG. 3. Here, the cause of the issue 310 is given as "Misaligned Derailleur Hanger." In addition, an instruction 315 has been provided that reads "Straighten hanger to align with cassette," along with an arrow superimposed over the party's view of his bike 320 and pointing to the derailleur hanger on the party's bike 320. Finally, a direction line highlighted by arrows 325 is superimposed over the party's bike 320 to help guide the party in straightening the derailleur hanger. Thus, the instructions and accompanying media are provided to the party via the party's augmented reality device 110 to facilitate the party's understanding of the solution to his issue and the party's execution of straightening the derailleur hanger on his bike 320 to address the cause of the party's issue.

Returning to FIG. 2, once the solution has been communicated to the party over the party's augmented reality device 110, the interactive module determines whether the issue has been resolved in Operation 260. Here, depending on the embodiment, the interactive module may go about making this determination in different ways. For instance, in particular embodiments, the interactive module may simply ask the party if the issue has been resolved. For example, the interactive module may display a text on the party's augmented reality device asking if the issue has been resolved along with a "yes" and "no" for the party to choose from. While in another example, the interactive module may verbally ask the party if the issue has been resolved and receive a verbal response from the party indicating "yes" or 'no." Those of ordinary skill in the art can contemplate over ways in which the interactive module can determine whether the issue has been resolved in light of this disclosure.

If the issue has not been resolved, then the interactive module returns to Operation 220 and gathers further information to attempt to identify a further cause of the party's issue. However, if the issue has been resolved, then the process ends. At this point, the party can disengage with the interactive component 115 by exiting the appropriate app or shutting down the appropriate website.

Information Collecting Module

Figure 4:
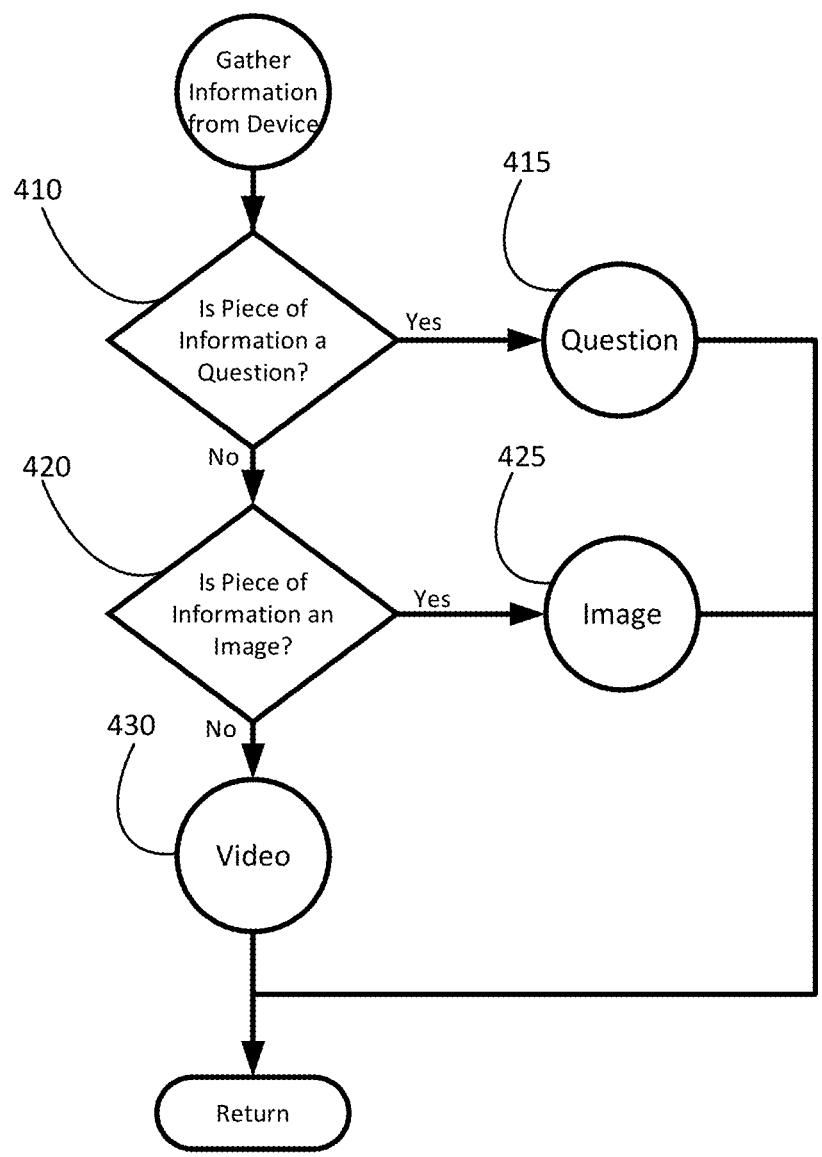
FIG. 4 illustrates a process flow for collecting information in accordance with various embodiments of the present invention.

Turning now to FIG. 4, additional details are provided regarding a process flow for collecting needed pieces of information according to various embodiments of the invention. In particular, FIG. 4 is a flow diagram of an information collecting module for performing such functionality according to various embodiments of the invention. For example, the flow diagram shown in FIG. 4 may correspond to operations carried out by one or more processors in one or more components, such as the interactive component 115 described above, as it executes the information collecting module stored in the component's volatile and/or nonvolatile memory.

As previously discussed, the information collecting module is invoked by the interactive module in various embodiments to collect the needed pieces of information used in identifying the cause of the party's issue. Accordingly, the process flow begins with the information collecting module determining whether the piece of information is a question to ask the party in Operation 410. For instance, returning to the example, the first piece of information to be collected may be to identify the style of bicycle the party has with the shifting issue. Accordingly, if the information collecting module determines the piece of information is a question to ask the party then the module proceeds to Operation 415. Here, in particular embodiments, the information collecting module performs this operation by invoking a question module that is configured to acquire the answer to the question from the party. Accordingly, the question module receives the answer from the party and stores the answer.

Thus, in the example, the question module may inquire the party as to whether the bicycle with the shifting issue is a road bike, a mountain bike, or a hybrid bike by having the question appear on the display of the party's augmented reality device 110 along with the three choices of bike. In response, the party selects the appropriate bike from the choices and the party's choice is then received and stored by the question module.

However, if the information collecting module instead determines the piece of information is not a question, then the information collecting module determines whether the piece of information is an image in Operation 420. Again, returning to the example, the piece of information to be collected may be an image of the rear cassette on the party's bicycle. Therefore, the information collecting module proceeds to Operation 425. Here, in particular embodiments, the information collecting module performs this operation by invoking an image module that is configured to have the party obtain the required image of the rear cassette by using the camera on the party's augmented reality device 110 and having the image sent to the image module. In turn, the image module obtains and stores the image of the rear cassette.

Continuing, if the information collecting module determines the piece of information is not an image, then the information collecting module assumes the piece of information is a video for the process flow shown in FIG. 4 and proceeds to Operation 430. Again, in particular embodiments, the information collecting module performs this operation by invoking a video module that is configured to have the party record the required video using the camera on the party's augmented reality device 110. Thus, returning to the example, the piece of information needed may be a video of the rear cassette as the party shifts through the gears on the bicycle. Accordingly, the video module provides instructions to the party on the display of his augmented reality device 110 on how to record the video of the rear cassette as he shifts through the gears and the party returns the recorded video to the video module. Upon obtaining the video, the video module in various embodiments stores the video.

One of ordinary skill in the art should understand that depending on the embodiment, the information collecting module may be configured to collect other pieces of information besides answers to questions, images, and videos. For instance, in particular embodiments, the information collecting module may be configured to collect different audio information that may be needed in addressing the party's issue. For instance, returning to the example, the information needed to be gathered may be an audio of the party shifting through gears in the rear cassette. Depending on the issue, the sound of the shifting may make various clicking noises that can help to identify a particular issue with the shifting. Other types of information may be gathered in other embodiments.

Question Module

Figure 5:
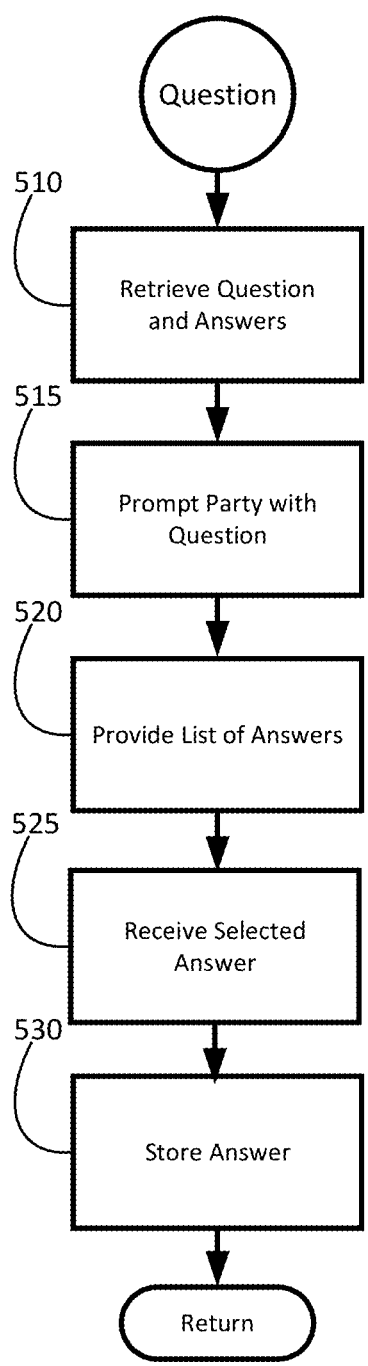
FIG. 5 illustrates a process flow for collecting information via a question in accordance with various embodiments of the present invention.

Turning now to FIG. 5, additional details are provided regarding a process flow for asking the party a question according to various embodiments of the invention. In particular, FIG. 5 is a flow diagram of a question module for performing such functionality according to various embodiments of the invention. For example, the flow diagram shown in FIG. 5 may correspond to operations carried out by one or more processors in one or more components, such as the interactive component 115 described above, as it executes the question module stored in the component's volatile and/or nonvolatile memory.

Here, the question module is invoked by the information collecting module in various embodiments to ask the party a question to collect a particular piece of information. Accordingly, the process flow begins with the question module retrieving the question and possible answers in Operation 510. For instance, depending on the embodiment, the information collecting module may provide the question module with the question and possible answers or the question module may retrieve the question and possible answers from some type of storage media 130. In addition, the question may be more open-ended without having any possible answers.

Therefore, returning to the example, the question module may retrieve the question "What is the bike type having the shifting problem?" and the possible answers "road," "mountain," and "hybrid." At this point, the question module prompts the party with the question in Operation 515 through the party's augmented reality device 110 and provides a list of answers for the party to choose from via the device 110 in Operation 520. Accordingly, the party responds to the question with the appropriate answer. For instance, the party may select the appropriate answer from the list of answers shown on the display of his augmented reality device 110 or may speak the appropriate answer into the microphone of the device 110. In turn, the answer is sent to the question module and the module receives the answer in Operation 525. In particular embodiments, the question module may make use of speech analytics technology to determine the answer provided by the party. The question module then completes the process flow by storing the answer to the question in Operation 530 and returning to the module that invoked the question module (e.g., the information collecting module).

Image Module

Figure 6:
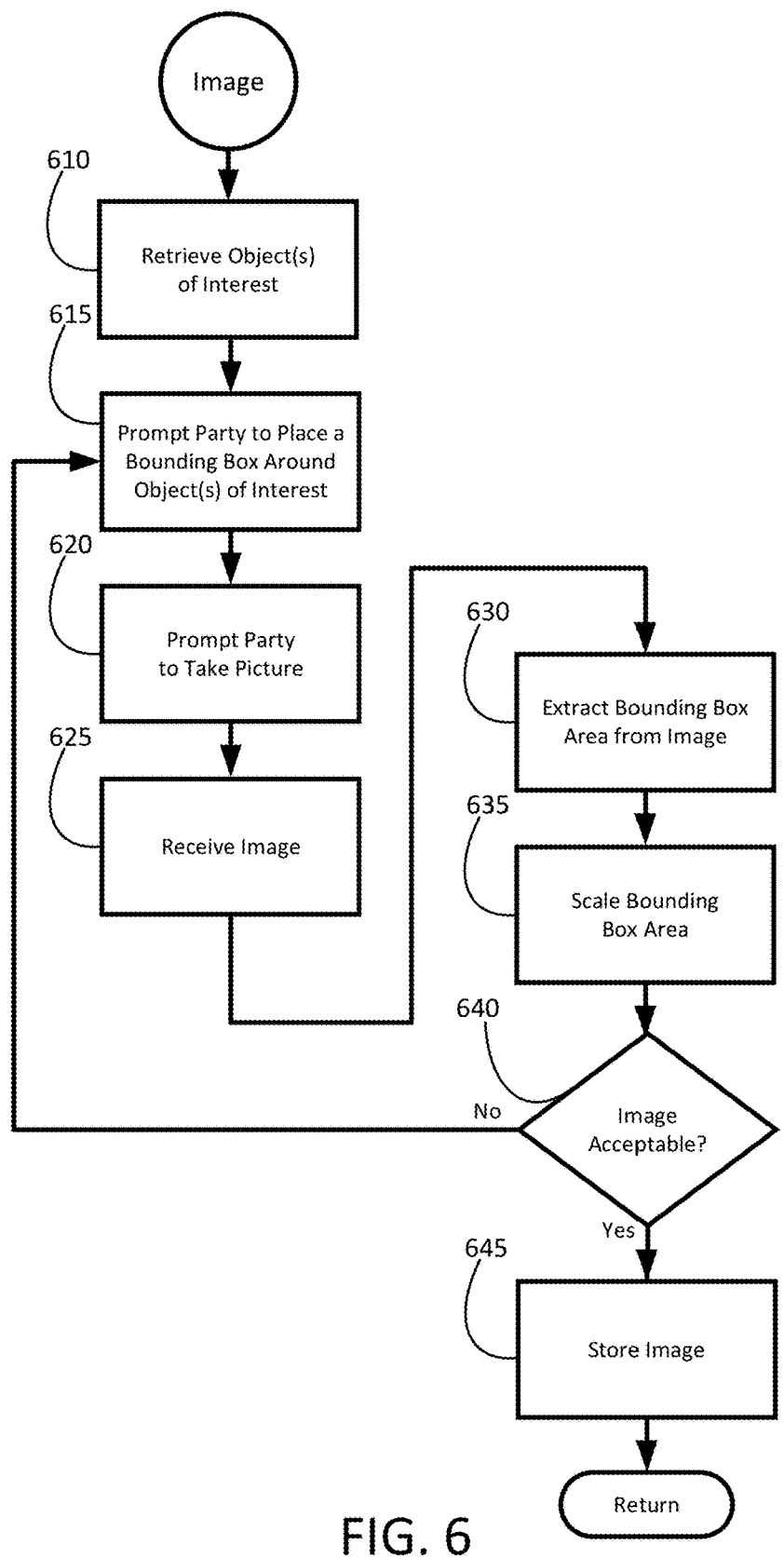
FIG. 6 illustrates a process flow for collecting information via an image in accordance with various embodiments of the present invention.

Turning now to FIG. 6, additional details are provided regarding a process flow for obtaining an image of one or more objects of interest according to various embodiments of the invention. In particular, FIG. 6 is a flow diagram of an image module for performing such functionality according to various embodiments of the invention. For example, the flow diagram shown in FIG. 6 may correspond to operations carried out by one or more processors in one or more components, such as the interactive component 115 described above, as it executes the image module stored in the component's volatile and/or nonvolatile memory.

Similar to the question module, the image module is invoked by the information collecting module in various embodiments to acquire an image of one or more objects of interest from the party to collect a particular piece of information. Accordingly, the process flow begins with the image module retrieving the object(s) of interest in Operation 610. Again, depending on the embodiment, the information collecting module may provide the image module with the object(s) of interest or the image module may retrieve the object(s) of interest from some type of storage media 130.

Figure 7:
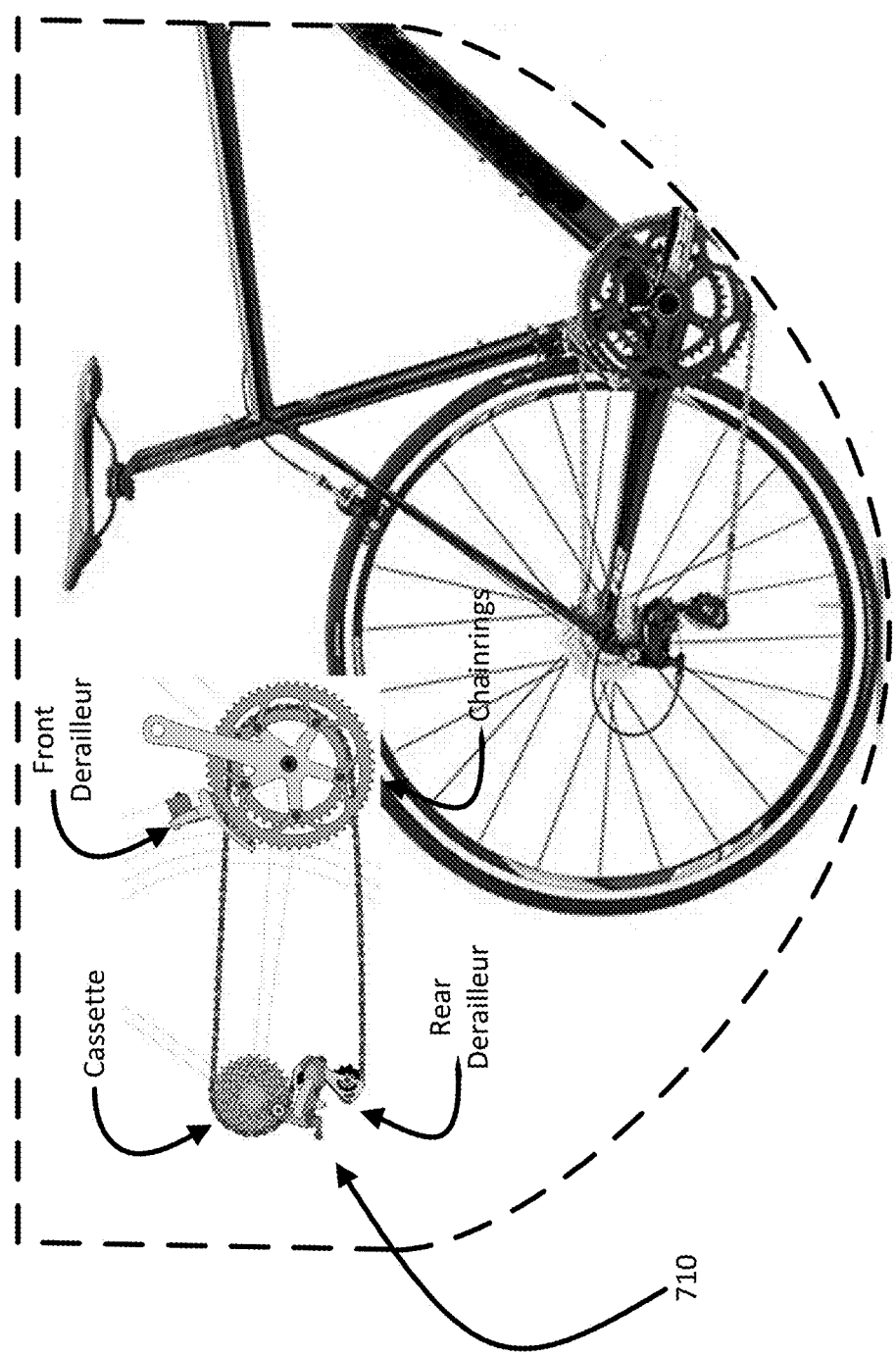
FIG. 7 is a second example view of one lens of an augmented reality device from the perspective of a wearer of the device resulting from practicing various embodiments of the present invention.

The image module then prompts the party to place a bounding box around the object(s) of interest in Operation 615. Again, returning to the example, the image module may instruct the party to place a bounding box around a side view of the cassette on the party's bike. Here, in particular embodiments, the image module may provide assistance to the party in locating the object(s) of interest by providing helpful information. For example, turning briefly to FIG. 7, here the party is provided with an image of a bicycle drivetrain 710 on the display of his augmented reality device 110 with the components of the drivetrain labeled. This image allows the party to easily identify the cassette on his own bike. In other instances, the party may be asked to view the drivetrain of his bicycle through his augmented reality device 110 and the drivetrain may then be appropriately labeled. Accordingly, in these instances, the image module (or some other module) may be configured to perform object recognition on the party's view so that the components of the drivetrain can be appropriately labeled. For example, in particular embodiments, the image module may utilized one or more predictive models to perform object recognition in identifying the components of the drivetrain on the party's bicycle. Particular types of such predictive models are detailed further herein.

Figure 8:
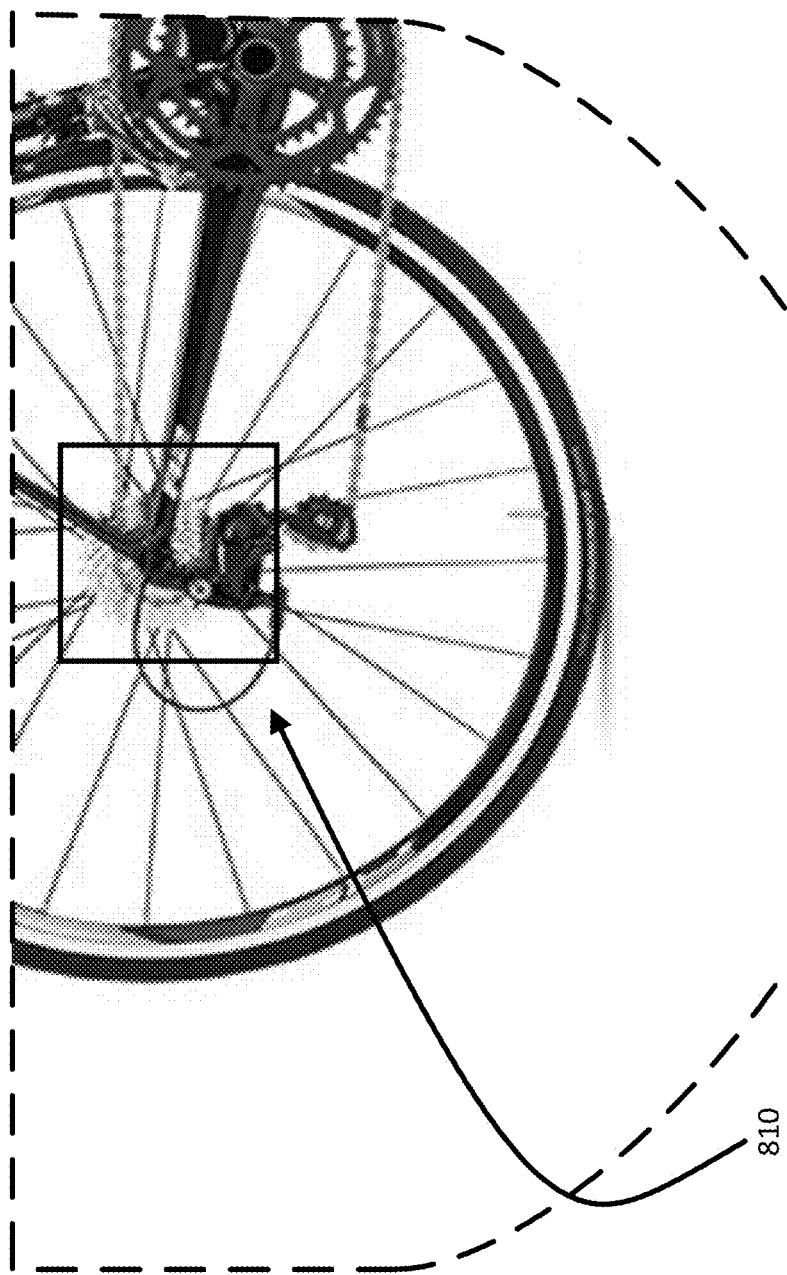
FIG. 8 is a third example view of one lens of an augmented reality device from the perspective of a wearer of the device resulting from practicing various embodiments of the present invention.

A bounding box is an imagery box placed around an object or objects of interest. Here, the party uses one or more input elements (e.g., gesture-based controls) on his augmented reality device 110 to place a box around the object(s) as viewed through the display of his device 110. For instance, turning briefly to FIG. 8, the party's view through the display of his augmented reality device 110 is shown with a bounding box 810 placed around the cassette on his bicycle.

Returning to FIG. 6, the image module next prompts the party to take a picture of the object(s) of interest in Operation 620 by using the camera on his augmented reality device 110. Depending on the embodiment, the device 110 may be configured to take a picture of the party's entire view through the device 110 or may be configured to take a picture of only the bounding box area of the view. In addition, in particular embodiments, the image module may be configured to take the picture automatically without the party's involvement instead of requesting the party to do so. Once the picture has been taken, the augmented reality device 110 sends the produced image to the interactive component 115 (or the interactive component 115 retrieves the produced image) and accordingly, the image module receives the image in Operation 625.

At this point, if the image is of the party's entire view through his augmented reality device 110, then the image module extracts the bounding box area of the image in Operation 630. The "cropped" image is then scaled to a standard size in Operation 635 in particular embodiments such as, for example, 224×224 pixels.

The image module then determines whether the image is acceptable in Operation 640. Here, the image module may simply determine whether the image (cropped image) actually contains the object(s) of interest. Again, depending on the embodiment, the image module may utilized one or more predictive models to perform object recognition in making such a determination. In addition, the image module may also determine the quality of the image in particular embodiments. For instance, the image module may be configured to use one or more non-reference image quality metrics to evaluate the quality of an image such as auto correlation, average gradient, blur, distortion measure, edge intensity, and entropy.

If the image module determines the image is not acceptable, then the module returns to Operation 615 so that another picture of the object(s) of interest can be taken. Here, the image module may advise the party on how to better take the picture by for example, requesting the party take a closer-up picture of the object(s) or take the picture in better lighting. However, if the image module determines the image is acceptable, then the module stores the image in Operation 645. The image module then completes the process flow and returns to the module that invoked the image module (e.g., the information collecting module).

Video Module

Figure 9:
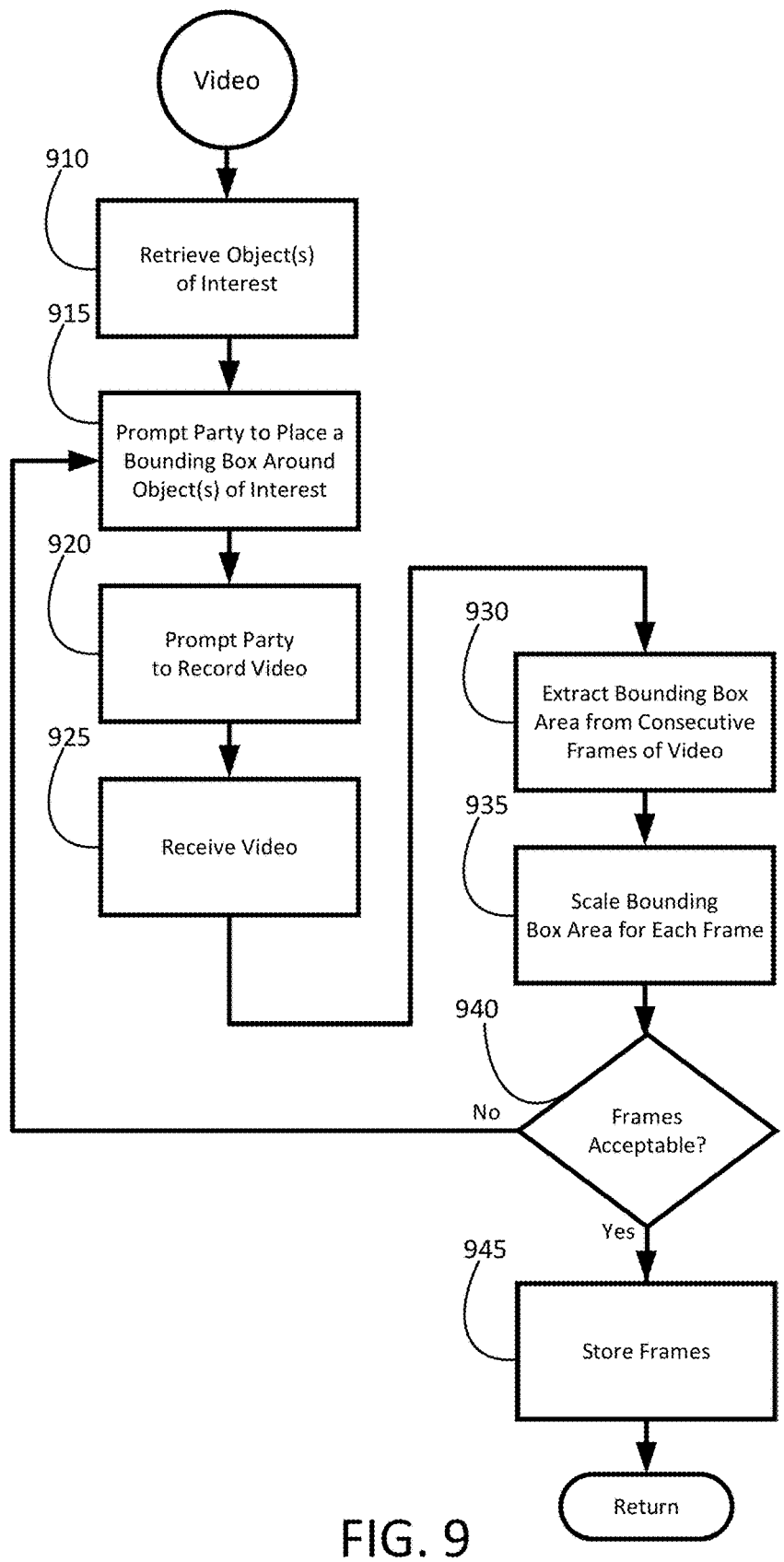
FIG. 9 illustrates a process flow for collecting information via a video in accordance with various embodiments of the present invention.

Turning now to FIG. 9, additional details are provided regarding a process flow for obtaining a video of one or more objects of interest according to various embodiments of the invention. In particular, FIG. 9 is a flow diagram of a video module for performing such functionality according to various embodiments of the invention. For example, the flow diagram shown in FIG. 9 may correspond to operations carried out by one or more processors in one or more components, such as the interactive component 115 described above, as it executes the video module stored in the component's volatile and/or nonvolatile memory.

Similar to the question and image modules, the video module is invoked by the information collecting module in various embodiments to acquire a video of one or more objects of interest from the party to collect a particular piece of information. Accordingly, the process flow begins with the video module retrieving the object(s) of interest in Operation 910. Again, depending on the embodiment, the information collecting module may provide the video module with the object(s) of interest or the video module may retrieve the object(s) of interest from some type of storage media 130.

The video module then prompts the party to place a bounding box around the object(s) of interest in Operation 915. For instance, returning to the example, the video module may instruct the party to place a bounding box around a side view of the cassette on the party's bike. Again, in particular embodiments, the video module may provide assistance to the party in locating the object(s) of interest by providing helpful information. In addition, the video module may request the party to take some action and/or record some moment with respect to the object(s) of interest. For example, the video module may request the party to shift through the gears while recording the video so that the shifting action can be captured in the video.

The video module next prompts the party to record the video of the object(s) of interest in Operation 920 by using the camera on his augmented reality device 110. Again, depending on the embodiment, the device 110 may be configured to record a video of the party's entire view through the device 110 or may be configured to record a video of only the bounding box area of the view. Further, in particular embodiments, the video module may record the video automatically instead of requesting the party to do so. Once the video has been recorded, the augmented reality device 110 sends the produced video to the interactive component 115 (or the interactive component 115 retrieves the produced video) and accordingly, the video module receives the video in Operation 925.

At this point, the video module extracts a plurality of consecutive frames in the bounding box area of the video in Operation 930. Generally speaking, the number of frames that are extracted varies depending on the range of motion to detect in the video. The larger the range of motion, the greater the number of frames that are extracted. For instance, in the example, since the range of motion to detect in the video is of the chain shifting over the different gears (cogs) of the cassette, the number of frames extracted from the video should ideally cover the chain shifting over each one of the gears in the cassette. In some instances, the party may be asked to film a first video of the chain shifting from the highest gear (smallest cog) to the lowest gear (largest cog) and a second, separate video of the chain shifting from the lowest gear (largest cog) to the highest gear (smallest cog). Here, a separate set of consecutive frames would be extracted from each video. The frames are then scaled to a standard size in Operation 935 in particular embodiments such as, for example, 60×40 pixels.

Like the image module, the video module then determines whether the extracted frames are acceptable in Operation 940. Again, the video module may simply determine whether the frames actually contains the object(s) of interest. In addition, the video module may also determine the quality of the frames in particular embodiments.

If the video module determines the extracted frames are not acceptable, then the module returns to Operation 915 so that another video of the object(s) of interest can be recorded. Again, the video module may advise the party on how to better record the video. However, if the video module determines the extracted frames are acceptable, then the module stores the frames in Operation 945. The video module then completes the process flow and returns to the module that invoked the video module (e.g., the information collecting module).

Cause Module

A cause module is made use of in various embodiments of the invention to determine the cause of the party's issue based on the information gathered from the party through the party's augmented reality device 110. Therefore, a mechanism is needed in these various embodiments that allows the cause module to identify the likely candidate with a high degree of accuracy. With this in mind, particular embodiments of the invention involve the cause module making use of machine learning (also known as a predictive model) to achieve a high degree of accuracy in determining the cause of the party's issue.

Generally speaking, machine learning (predictive model) is concerned with the construction and study of systems (e.g., computers) that can learn from data and then predict based on learned behavior. The core of machine learning deals with representation and generalization. That is to say, a core objective of a learning machine is to generalize from its experience. Generalization is the ability of the learning machine to perform accurately on new, unseen instances after having experienced a training dataset comprising instances with known outcomes. Thus, a learning machine focuses on providing predictions based on known properties learned from a training dataset.

Several types of learning machines (predictive models) exist and may be applicable with respect to embodiments of the invention. For instance, a decision tree uses a tree-like graph or model of decisions (flowchart-like structure) to map observations about an item to conclusions about the item's target value. In general, the flowchart-like structure is made up of internal nodes representing tests on attributes and branches flowing from the nodes representing outcomes to these tests. The internal nodes and branches eventually lead to leaf nodes representing class labels. Accordingly, a path from a root to a leaf represents classification rules.

Another type of learning machine is a support vector machine (SVM). SVMs are generally a set of related supervised learning methods that can be used for classification purposes. That is to say, SVMs are generally used to classify an instance into one class or another. Given a set of training examples, each marked as belonging to one of two categories (e.g., classes), a SVM training algorithm builds a model that predicts whether a new sample falls into one of the two categories.

There are countless other types of learning machines (predictive models), such as Bayesian networks, clustering, and reinforcement learning to name a few, that one of ordinary skill in the art may make use of with respect to various embodiments of the invention. In many instances, the type of learning machine that is utilized is based on the type of information used as input to the machine. Case in point, with respect to the embodiments of the invention described herein, the type of learning machine (predictive model) utilized when the information input into the machine is an image or a video is a neural network.

Neural networks have been used in many instances involving object recognition in images and action recognition in videos over conventional approaches because conventional approaches typically make certain assumptions about the circumstances under which an image or a video was taken that seldom hold in real-world environments. Most conventional approaches follow the paradigm of pattern recognition that consists of two steps in which the first step computes complex handcrafted features from a raw image or frames of a video and the second step learns classifiers based on the obtained features. However, it is rarely known in real-world scenarios which features are important for the task at hand, since the choice of feature is highly problem-dependent.

However, deep learning models, such as neural networks, are a class of machines that can learn a hierarchy of features by building high-level features from low-level ones, thereby automating the process of feature construction. An artificial neural network is a learning algorithm inspired by the structure and functional aspects of biological neural networks. Computations are structured in terms of an interconnected group of artificial neurons, processing information using a connectionist approach to computation. Artificial neural networks are typically used to model complex relationships between inputs and outputs to find patterns in data or to capture a statistical structure in an unknown joint probability distribution between observed variables.

Here, when the information collected from the party includes images and/or videos, a hierarchical program structure may be used in various embodiments composed of individual convolutional neural networks (ConvNets) for the different possible causes of the issue and the cause module makes use of these individual ConvNets to predict which possible cause is the likely cause of the party's issue. Specifically, ConvNets are a type of deep model in which trainable filters and local neighborhood pooling operations are applied alternatingly on raw input images, resulting in a hierarchy of increasingly complex features. ConvNets can achieve superior performance on visual object and action recognition tasks without relying on handcrafted features. Thus, these types of neural networks are used in various embodiments because they have proven very effective in visual object and action recognition and classification.

ConvNets are made up of four main operations (layers), the first being convolution. The primary purpose of convolution is to extract features from an input image. Accordingly, convolution preserves the spatial relationship between pixels by learning image features using small squares of input data.

A filter (kernel or feature detector) is slid over an image by so many pixels at a time (stride) and for every position, an element-wise multiplication is computed. The multiplication outputs are then added to get a final integer which forms a single element of the output matrix (activation or feature map). Different filters produce different feature maps for the same input image. That is to say, different filters detect different features from an image. In practice, a ConvNet learns the values of these filters on its own during the training process. Thus, the more number of filters that are used, the more image features get extracted and the better the ConvNet becomes at recognizing patterns in unseen images.

Accordingly, the size of the feature map is controlled by three parameters that are set before convolution is carried out. The first parameter is depth, which corresponds to the number of filters used for the convolution operation. If three different filters are used, then the depth of the feature map is three (the three feature maps are stacked 2D matrices). The second parameter is stride that identifies the number of pixels by which the filter matrix is slid over the input matrix. A stride of one means the filter is moved one pixel at a time. The larger the stride, the smaller the produced feature maps. The third and final parameter is zero-padding that identifies whether the input image matrix is padded with zeros around the border. Zero-padding is added so that the filter can be applied to the bordering elements of the input image matrix. Consequently, zero padding allows one to control the size of the feature maps.

The size of a feature map produced from a convolution can be determined as ((input volume size−size of the filter+ 2*padding applied)/number of strides)+1. Therefore, if the input image is 32×32×3 and ten filters are going to be applied, using a single stride, and no padding, then the size of the feature map=((32−3+2*0)/1)+1=30. Thus, making the feature map equal to 30, 30, 10.

The second operation in a ConvNet is a rectified linear unit (ReLU) layer that can be used after every convolution operation. This operation replaces all of the negative pixel values in the feature map by zero. The purpose of ReLU is to introduce non-linearity in the ConvNet, since most real-world data one would want the ConvNet to learn is non-linear. Because convolution is a linear operation, non-linearity can be accounted for by introducing a non-linear function like ReLU. The output feature map from this operation can be referred to as the rectified feature map.

A third operation in a ConvNet is spatial pooling (sub-sampling or down sampling). Spatial pooling reduces the dimensionality of each feature map but retains the most important information. That is to say, the function of pooling is to progressively reduce the spatial size of the input representation. Depending on the embodiment, different types of pooling may be applied such as maximum, average, and sum. For example, in max-pooling, a spatial neighborhood (e.g., 2×2 window) is defined and the largest element from the rectified feature map within the window is taken. The window is slid over the rectified feature map and the maximum value is taken for each slide (each region). Accordingly, in other examples, the average or sum of all elements within in the window could be taken instead.

As a result of pooling, the input representations are made smaller and more manageable. The number of parameters and computations are reduced in the ConvNet, therefore, controlling overfitting. The ConvNet is made invariant to small transformations, distortions, and translations in the input image. That is to say, a small distortion in input will not change the output of pooling since the maximum/average value is taken in a local neighborhood. Finally, pooling helps to arrive at an almost scale invariant representation of the image (the exact term is "equivariant"). This is very powerful since objects can be detected in an image no matter where they are located. Note that it is not necessary to have a pooling layer after every convolutional layer in a ConvNet architecture.

The fourth operation in a ConvNet is classification. The classification operation represents a fully-connected layer that is a traditional multi-layer perception that uses a softmax activation function in the output layer (although other classifiers such as SVM can be used). Here, the term "fully-connected" implies that every neuron in the previous layer is connected to every neuron on the next layer. Accordingly, the output from the convolutional and pooling layers represent high-level features of the input image. The purpose of the fully-connected layer is to use these features for classifying the input image into various classes based on a training dataset. The sum of output probabilities from the fully-connected layer is one. This is ensured by using the softmax as the activation function in the output layer of the fully connected layer. The softmax function takes a vector of arbitrary real-valued scores and squashes it to a vector of values between zero and one that sum to one. Thus, the convolution and pooling layers act as feature extractors from the input image and the fully-connected layer acts as a classifier.

To train a ConvNet using a training dataset in various embodiments, all filters and parameter weights are initialized with random values. A training image is then provided as input to the ConvNet and the network goes through the forward propagation step and finds the output probabilities for each class. The total error at the output layer is calculated (e.g., total error=summation of 0.5*(target probability−output probability)^2) and backpropagation is used to calculate the gradients of the error with respect to all weights in the ConvNet. Gradient descent is then used to update all filter and parameter weights to minimize the output error. Weights are adjusted in proportion to their contribution to the total error. Normally, parameters such as number of filters, filter sizes, architecture of the network, etc. are fixed before training the ConvNet and do not change during the training process. Only the values of the filter matrix and connection weights are updated.

An example of a ConvNet architecture that may be used in various embodiment for object recognition in an image is an architecture designed by the Visual Geometry Group from University of Oxford. The two best performing architectures to date are sixteen and nineteen layer models. Because of the depth of the architecture, 3×3 filters are used in all convolutional layers and a convolutional stride of one to help reduce the number of parameters. The padding is set to one. During training, the size of the input image is fixed at 224×224. Each training image is randomly cropped to obtain the fixed size, as well as pre-processed by subtracting the mean RGB value, computed on the training set, from each pixel.

The architecture includes five max-pooling layers that follow some of the convolutional layers, but not all. Max-pooling is performed over a 2×2 pixel window, with stride two. The stack of convolutional layers is followed by three fully-connected layers, with the last layer having a number of channels equal to the number of classifications and being a softmax layer. All the hidden layers are equipped with the rectification (ReLU) non-linearity. Further, the width of the convolutional layers (the number of channels) is rather small, starting with sixty-four in the first layer and then increasing by a factor of two after each max-pooling layer, until it reaches five hundred and twelve.

Figures 10A, 10B:
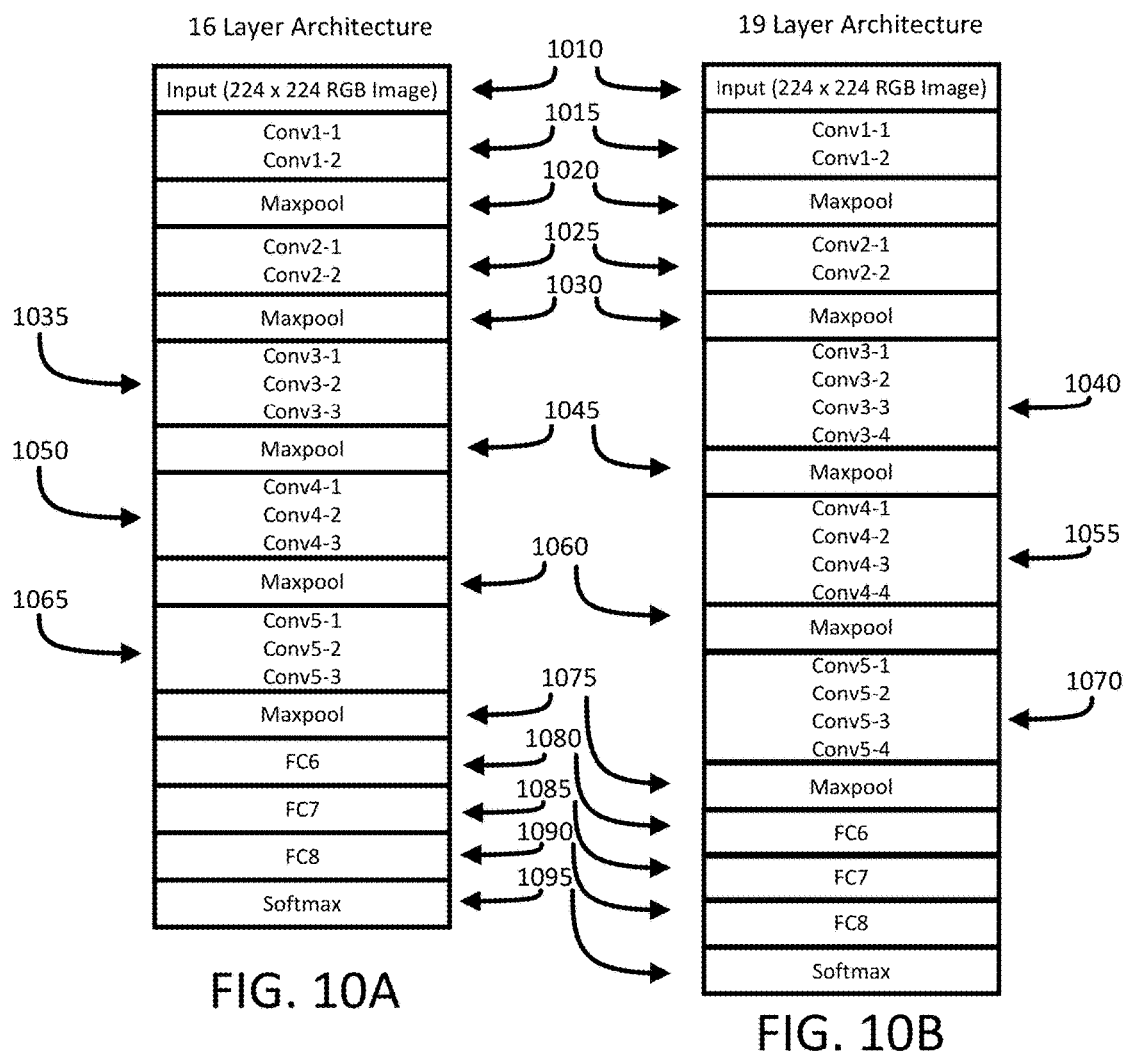
FIGS. 10A and 10B illustrate architectures for convolutional neural networks that may be used in accordance with various embodiments of the present invention.

Turning to FIGS. 10A and 10B, two example architectures based on Visual Geometry Group's design are illustrated with a sixteen layers architecture shown in FIG. 10A and a nineteen layers architecture shown in FIG. 10B. Here, both architectures are trained using images 1010 that are 224×224 and initially include two instances 1015, 1025 of two convolution layers, each followed by a max-pooling layer 1020, 1030. The ReLU activation function is not shown for brevity. However, the architecture illustrated in FIG. 10A then includes three instances 1035, 1050, 1065 with three convolution layers, followed by max-pooling layers 1045, 1060, 1075. While the architecture illustrated in FIG. 10B then includes three instances 1040, 1055, 1070 of four convolution layers, followed by max-pooling layers 1045, 1060, 1075. Finally, both architectures conclude with three fully-connected layers 1080, 1085, 1090 with a softmax output 1095.

As for videos, the approach for using ConvNets needs to consider the motion information encoded in multiple contiguous frames. To achieve this, 3D convolution is performed in the convolutional layers of a ConvNet so that discriminative features along both spatial and temporal dimensions are captured.

A first approach to extracting these multiple discriminative features is to apply multiple distinct convolutional operations at the same location on the input. Accordingly, 3D convolution is achieved by convolving a 3D kernel to the cube formed by stacking multiple contiguous frames together from a video. As a result, the feature maps in the convolution layer are connected to multiple contiguous frames in the previous layer, thereby capturing motion information.

However, with that said, a 3D convolutional kernel can only extract one type of feature from the frame cube, since the kernel weights are replicated across the entire cube. Accordingly, a general design principle of ConvNets is that the number of feature maps should be increased in late layers by generating multiple types of features from the same set of lower-level feature maps. This can be achieved by applying multiple 3D convolutions with distinct kernels to the same location in the previous layer. Thus, a 3D ConvNet architecture based on this approach should generate multiple channels of information from adjacent video frames and perform convolution and pooling separately in each channel. The final feature representation is then obtained by combining information from all the channels.

Figure 11A:
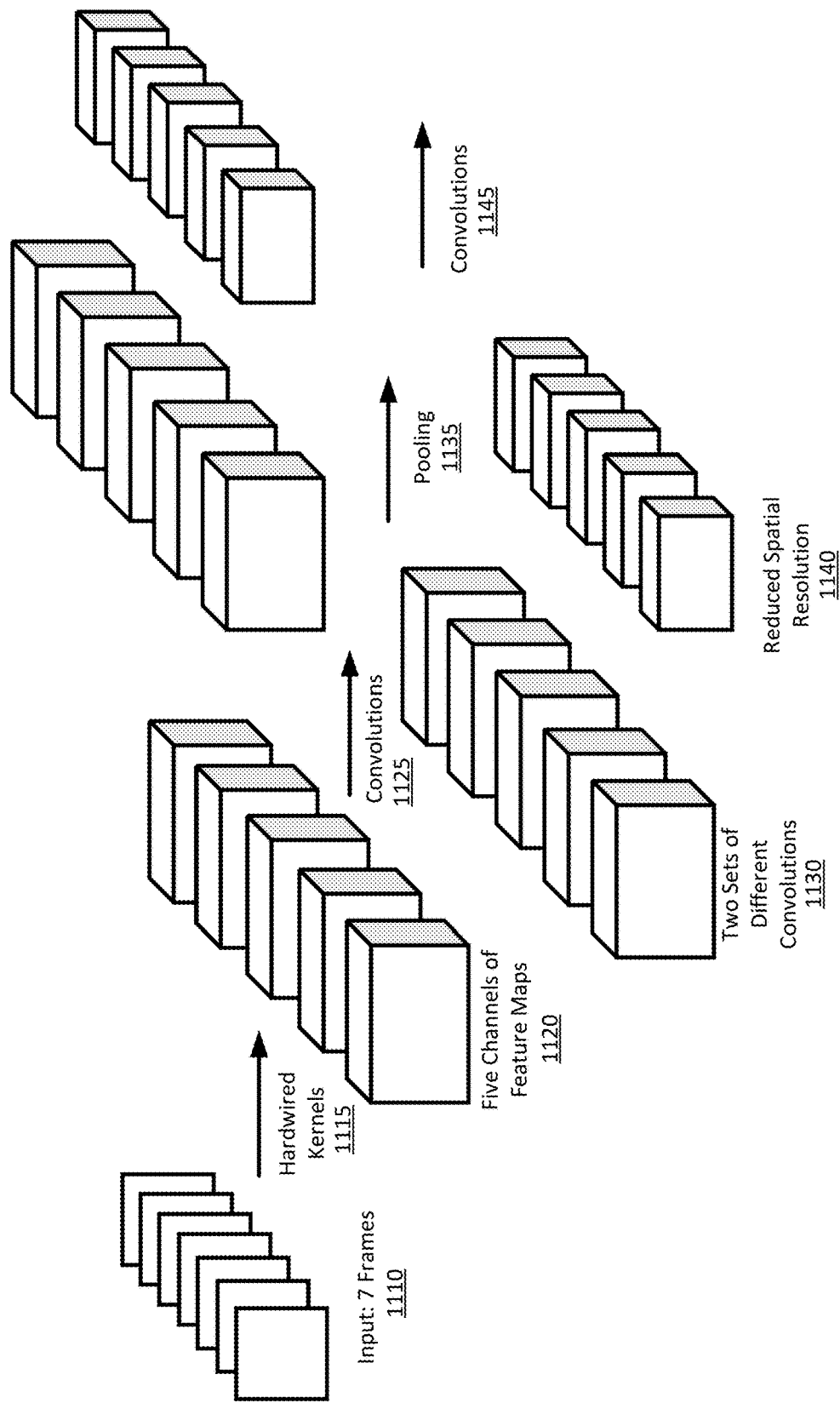

For example, a sample architecture based on this approach is shown in FIGS. 11A and 11B. This particular architecture is based on work performed by Shuiwang Ji, Wei Xu, Ming Yang, and Kai Yu in developing convolutional neural networks for human action recognition as discussed in a paper entitled "3D Convolutional Neural Networks for Human Action Recognition," Arizona State University and NEC Laboratories America, Inc., the contents of which are incorporated by reference. The input 1110 in this example is seven contiguous frames from a video displaying motion. Here, the seven frames are a same size such as 60×40. A set of hardwire kernels 1115 are initially applied to the input frames 1110 to generate multiple channels of information from the frames. Here, five different channels 1120 are produced known as gray, gradient-x, gradient-y, optflow-x, and optflow-y. The gray channel contains the gray pixel values of the seven input frames. The gradient-x and gradient-y channels are obtained by computing gradients along the horizontal and vertical directions, respectively, on each of the seven frames. The optflow-x and optflow-y channels contain the optical flow fields, along the horizontal and vertical directions, respectively, computed from adjacent input frames. The purpose of the hardwired layer 1115 is to encode prior knowledge on features, which usually leads to better performance as compared to random initialization.

At this stage in the architecture, 3D convolutions 1125 are applied to each of the five channels separately. For example, two sets of convolutions are applied using a different kernel with size of 7×7×3 (7×7 in the spatial dimension and 3 in the temporal dimension), resulting in two sets of feature maps 1130. Next, pooling (e.g., 2×2) 1135 is applied on each of the feature maps found in the two sets to reduce the spatial resolution (reduce the number of parameters) 1140.

Following pooling 1135, another set of 3D convolutions 1145 is applied on each of the five channels in the two sets of feature maps separately. Here, for example, three sets of convolutions using a different kernel with size of 7×6×3 may be applied at each location, leading to six distinct sets of feature maps 1150 (FIG. 11B). Again, this convolutions layer is followed by applying pooling (e.g., 3×3) 1155 on each feature map found in the six sets of feature maps 1150 to reduce spatial resolution 1160.

At this point, the size of the temporal dimension is already relatively small (e.g., three for gray, gradient-x, gradient-y and two for optflow-x and optflow-y). Therefore, convolution 1165 is only performed in the spatial dimension (e.g., using a kernel with size 7×4) to reduce the size of the output feature maps (e.g., 1×1) 1170 with each of the output feature maps 1170 being connected to all of the feature maps found in the previous pooling layer 1160.

At this point, the seven input frames have been converted into a feature vector (e.g., 128D) capturing the motion information in the input frames. Accordingly, the output layer 1180 is composed of the same number of units as the number of actions, and each unit is fully connected 1175 to each of the output feature maps 1170 found in the previous convolution layer. A classifier, such as a linear classifier, is then applied on the feature vector to classify the action found in the seven frames. To train the model, all of the trainable parameters are initialized randomly and trained by an online error back-propagation algorithm.

A second approach to extending ConvNets to action recognition in videos is an architecture based on two separate recognition streams (spatial and temporal), that are then combined by late fusion. An example of such an architecture is provided in FIG. 12. This particular architecture is based on work performed by Karen Simonyan and Andrew Zisserman discussed in a paper entitled "Two-Stream Convolutional Networks for Action Recognition in Videos," Visual Geometry Group, University of Oxford, the contents of which are incorporated by reference.

Figure 12:
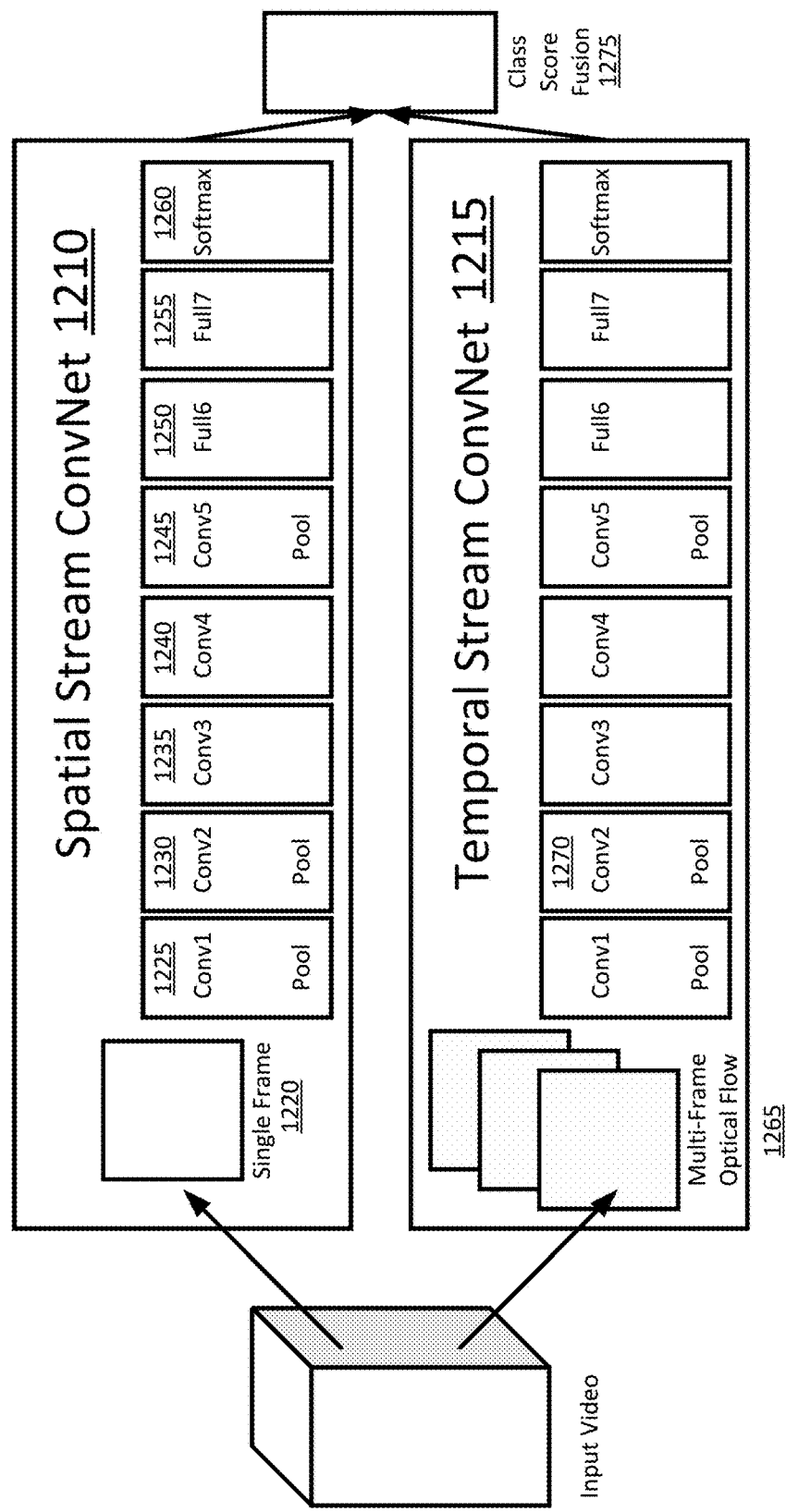
FIG. 12 illustrates another architecture for convolutional neural networks that may be used in accordance with various embodiments of the present invention.

As mentioned, a video can naturally be decomposed into spatial and temporal components. The spatial component, in the form of individual frames, carries information about the scene and objects depicted in the video. The temporal component, in the form of motion across the frames, conveys the movement of the observer who is filming the video and the objects depicted in the video. Therefore, this particular architecture shown in FIG. 12 is divided into two streams, with each stream being implemented with a ConvNet, the softmax scores of which are combined by late fusion.

Looking first at the spatial stream ConvNet 1210, this ConvNet 1210 operates on individual video frames 1220 to perform action recognition from still images. This is because some actions are strongly associated with particular objects. The architecture of the ConvNet 1210 builds upon recent advances in large-scale image recognition methods. The architecture includes five consecutive convolution layers 1225, 1230, 1235, 1240, 1245, with the first two convolution layers 1225, 1230 including a normalization operation, followed by a pooling operation, and the last convolution layer 1245 also followed by a pooling operation. The architecture then includes two fully-connected layers 1250, 1255 that are followed by an output layer 1260 based on softmax. For example, a specific architecture based on this structure may include: (1) a first convolution layer 1225 having a 7×7×96 kernel, stride two, local response normalization, and pooling based on 2×2; a second convolution layer 1230 having a 5×5×256 kernel, stride two, local response normalization, and pooling based on 2×2; a third convolution layer 1235 having a 3×3×512 kernel and stride one; a fourth convolution layer 1240 also having a 3×3×512 kernel and stride one; and a fifth convolution layer 1245 having a 3×3×512 kernel, stride one, and pooling based on 2×2. The convolution layers 1225, 1230, 1235, 1240, 1245 are followed by two fully-connected layers 1250, 1255 with the first layer 1250 having a 4096 dropout and the second layer 1255 having a 2048 dropout. All the hidden layers 1225, 1230, 1235, 1240, 1245, 1250, 1255 use the rectification (ReLU) activation function. The output layer 1260 produces softmax scores for the each of the possible classifications.

As for the temporal stream ConvNet 1215, the configuration of the temporal stream ConvNet 1215 is the same as the spatial stream ConvNet 1210 except the normalization operation is removed from the second convolution layer 1270 of the temporal stream ConvNet configuration to reduce memory consumption. Further, the input is formed by stacking optical flow displacement fields between several consecutive frames 1265. Here, such input explicitly describes the motion between video frames, which enables the network to perform recognition easier since the network does not need to estimate motion implicitly. Several variations of the optical flow-based input can be considered.

For example, a dense optical flow can be seen as a set of displacement vector fields $d_t$ between the pairs of consecutive frames t and t+1. $d_t(u, v)$ denotes the displacement vector at the point (u, v) in frame t, which moves the point to the corresponding point in the following frame t+1. The horizontal and vertical components of the vector field, $d_t^x$ and $d_t^y$, can be seen as image channels, well suited to recognition using a convolutional network. Thus, to represent the motion across a sequence of frames, the flow channels $d_t^{x,y}$ of L consecutive frames is stacked to form a total of 2L input channels. While in another example, the optical flow is replaced by sampling at the same locations across several frames, with the flow, sampled along the motion trajectories.

As for considering bi-directional optical flow, such can be obtained by computing an additional set of displacement fields in the opposite direction. An input volume $I_t$ can be constructed by stacking L/2 forward flows between frames t and t+L/2 and L/2 backward flows between t−L/2 and t. The input volume $I_t$ has the same number of channels (2L) and the flow can be represented using either of the two methods.

Further, it can be beneficial to perform zero-centering of the network input to allow the model to better exploit the rectification non-linearities. Here, the displacement vector field components can take on both positive and negative values, and are naturally centered in the sense that across a large variety of motions, the movement in one direction is as probable as the movement in the opposite direction. However, given a pair of frames, the optical flow between them can be dominated by a particular displacement, e.g., caused by camera movement. To account for this, for each displacement field d, it mean vector is subtracted.

Finally, the softmax scores for both the spatial stream and the temporal stream are combined by late fusion 1275. Here, depending on the configuration, any number of fusion methods may be utilized such as, for example, averaging and multi-class linear SVM on staked L2-normalized softmax scores as features.

The training of both the spatial and temporal ConvNets 1210, 1215 is generally the same. The network weights are learnt by using mini-batch stochastic gradient descent with momentum. At each iteration, a mini-batch of samples is constructed by sampling videos (uniformly across the classes), from each of which a single frame is randomly selected. A 224×224 sub-image is then randomly cropped from the selected frame for the spatial net training and undergoes random horizontal flipping and RGB jittering. The videos may be rescaled beforehand so that the sub-image can be sampled from the whole frame, not just its center. As for the temporal net training, an optimal flow volume is computed for the selected training frames and from the volume, a fixed-size input is randomly cropped and flipped.

The learning rate is initially set, and then decreased according to a fixed schedule, which is kept the same for all training sets. For example, the learning rate may be initially set to $10^{-2}$ and the rate is changed to $10^{-3}$ after fifty thousand iterations, then to $10^4$ after seventy thousand iterations, and training is stopped after eighty thousand iterations. In addition, the rate may be changed to $10^{-3}$ after fourteen thousand iterations during fine-tuning, and training is stopped after twenty thousand iterations.

Finally, testing may involve sampling a fixed number of frames (e.g., 25) with equal temporal spacing between them. For each frame, a fixed number of ConvNet inputs (e.g., 10) may be obtained by cropping and flipping the four corners and the center of the frame. The class scores for the whole video are then obtained by averaging the scores across the sampled frames and crops therein.

Figure 13:
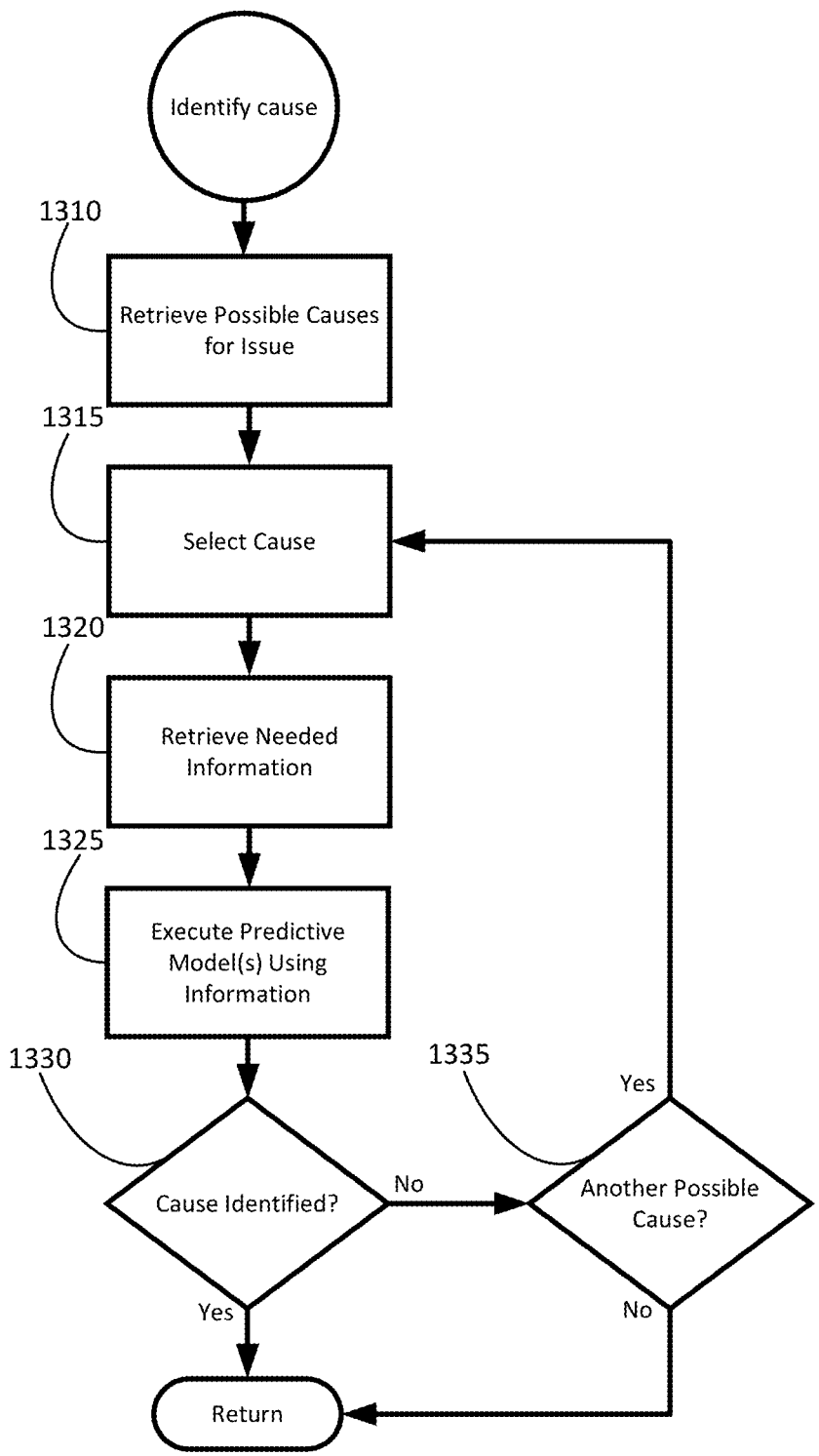
FIG. 13 illustrates a process flow for identifying a cause in accordance with various embodiments of the present invention.

Turning now to FIG. 13, additional details are provided regarding a process flow for identifying a cause to an issue according to various embodiments of the invention. In particular, FIG. 13 is a flow diagram of a cause module for performing such functionality according to various embodiments of the invention. For example, the flow diagram shown in FIG. 13 may correspond to operations carried out by one or more processors in one or more components, such as the interactive component 115 or the analytics component 120 described above, as it executes the cause module stored in the component's volatile and/or nonvolatile memory.

As previously mentioned, the cause module may be invoked by the interactive module in various embodiments to identify a cause of an issue based on information collected from the party. In particular embodiments, the cause module may reside on the interactive component 115 and the interactive module may invoke the cause module directly. However, in other embodiments, the cause module may reside on a separate component from the interactive component 115 such as, for example, the analytics components 120 described in FIG. 1. Here, the interactive module may invoke the cause module indirectly by communicating with the analytics component 120 that then invokes the cause module. Other configurations are possible with respect to the interactive module invoking the cause module.

Accordingly, the process flow begins with the cause module retrieving the possible causes of the issue in Operation 1310. Depending on the embodiment, some other module, such as the interactive module, may provide the cause module with the possible causes or the cause module may retrieve the possible causes from some type of storage media 130 based on the identified issue.

Next, the cause module selects a possible cause in Operation 1315. In various embodiments, the cause module may use a hierarchical program structure to work through various possible causes for the identified issue. This hierarchical program structure may allow the cause module to systematically work through the possible causes by making use of one or more predictive models along with the information gathered from the party to identify the likely cause of the party's issue. Accordingly, the cause module works through the possible causes in a hierarchical fashion until the module identifies a selected cause as the likely candidate of the party's issue.

Figure 15:
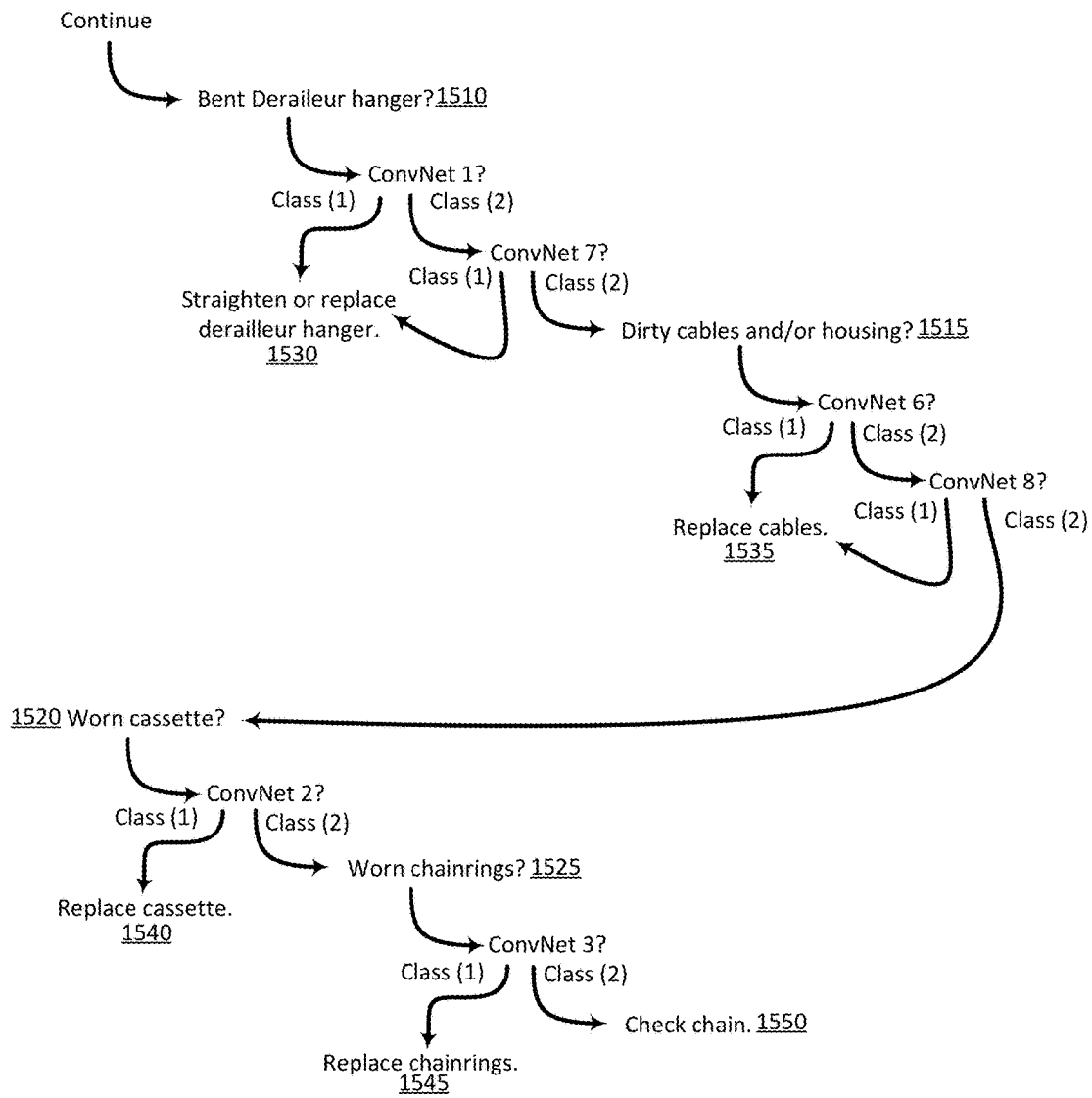
FIG. 15 illustrates a continuation of the hierarchical program structure used for addressing a bicycle gear shifting issue in accordance with various embodiments of the present invention.

For instance, turning to FIGS. 14 and 15, a hierarchical program structure 1410 is shown for addressing a gear shifting issue for a bicycle. A listing of ConvNets 1415 is provided at the top of the figure. In this example, the ConvNets include two types of models used to identify the cause of the party's issue with changing gears on his or her bicycle. The first type of model is an image model used to identify an object in an image that can be used to identify a cause of the party's issue. The second type of model is an action model used to identify a motion/movement in a video that can be used to identify a cause of the party' issue. The outcome of each of the models is to place the detected object or motion/movement into one of two classifications.

Looking now at the hierarchical program structure 1410, the first issue shown in the structure 1410 is stretched cables 1420. Accordingly, the cause module would execute the fourth ConvNet 1425 that embodies an action model that classifies a video of the bicycle's cassette as the party shifts to lower gears through the cassette to the lowest gear. The two classifications involve the model identifying in the video (1) the movement of cogs being skipped in the cassette as the party shifts to lower gears or (2) no movement of cogs being skipped in the cassette as the party shifts to lower gears. Here, if the video is classified as having movement of the cogs being skipped in the cassette as the party shifts to lower gears, then the identified cause of the party's shifting issue is stretched cables. In some embodiments, the video would need to be classified with a particular degree of certainty (e.g., threshold level of certainty). Accordingly, as a result of classifying the video as having movement of the cogs being skipped, the cause module would identify the solution to the issue is to re-index the cables 1435 by continuing down through the hierarchical structure for the identified class 1430.

However, if the video is instead classified as not having movement of the cogs being skipped in the cassette, then the cause module would move down through the hierarchy of the structure for the identified class 1440 and execute the fifth ConvNet 1445 that embodies an action model that classifies a video of the bicycle's cassette as the party shifts to higher gears through the cassette to the highest gear. In this instance, the two classifications involve the model identifying in the video (1) the movement of cogs being skipped in the cassette as the party shifts to higher gears or (2) no movement of cogs being skipped in the cassette as the party shifts to higher gears. Again, if the video is classified as having movement of the cogs being skipped in the cassette as the party shifts to higher gears, then the identified cause of the party's shifting issue is stretched cables 1420 and the cause module would identify the solution to the issue is to re-index the cables 1435.

If the cause module does not identify the cause of the issue being stretched cables 1420, then the cause module moves along the hierarchal structure to the next possible cause of poorly setup rear derailleur limits 1450. Here, the cause module executes the ninth ConvNet 1455 that embodies an action model that, like the fourth ConvNet 1425, classifies a video of the bicycle's cassette as the party shifts to lower gears through the cassette to the lowest gear. However, in this instance, the two classifications involve the model identifying in the video (1) the chain dropping off the cassette towards the spokes as the party shifts to the lowest gear or (2) the chain not dropping off the cassette towards the spokes as the party shifts to the lowest gear. If the video is classified as having the chain dropping off the cassette towards the spokes as the party shifts to the lowest gear, then the identified cause of the party's shifting issue is poorly setup rear derailleur limits 1450 and the cause module identifies the solution to the issue as adjusting the derailleur limits 1460. If the identified cause of the party's shifting issue is not identified as poorly setup rear derailleur limits 1450, then the cause module continues on to the next possible cause of poorly setup front derailleur limits 1465 and performs the appropriate operations with respect to this possible cause of the party's gearing issue.

The hierarchical program structure continues in FIG. 15 in the same fashion with respect to the other possible causes of a bent derailleur hanger 1510, dirty cables and/or housing 1515, worn cassette 1520, and worn chainrings 1525. Accordingly, the cause module can identify a cause of the party's issue by utilizing other images and videos provided by the party and corresponding ConvNets to identify a solution to the issue that may include straightening or replacing the derailleur hanger 1530, replacing the cables 1535, replacing the cassette 1540, and replacing the chainrings 1545. Finally, if none of the possible causes and corresponding solutions are identify by the cause module, the module reaches the suggestion to the party of checking the chain 1550 to see if it is worn and needs to be replaced.

Thus, returning now to FIG. 13, once the cause module has selected a possible cause, the module retrieves the needed information in Operation 1320. In various embodiments, the needed information is used as input to the corresponding predictive model(s) that are to be executed for the possible cause. For instance, returning to the example, the cause module retrieves the needed image and/or video for the corresponding ConvNet that is to be executed for the selected possible cause.

At this point, the cause module executes the predictive model(s) using the information in Operation 1325. Again, looking at the example, the cause module executes the corresponding ConvNet using the retrieved image or video to determine whether the image or video falls into the classification associated with the possible cause for the party's shifting issue.

Accordingly, the cause module determines whether a cause has been identified for the issue in Operation 1330. That is to say, the cause module determines whether the currently selected cause is likely the cause of the party's issue. In particular embodiments, this determination may be dependent on whether the currently selected cause has been identified as the likely cause with a certain degree of certainty. For example, the predictive model(s) may provide a measure of certainty along with the classification and the cause module may be configured to require the measure to be above a threshold to use the possible cause as the likely cause of the party's issue.

If the cause module determines the likely cause of the issue has not been identified, then the cause module determines whether another possible cause is available for the issue in Operation 1335. If so, then the cause module returns to Operation 1315 to select the next possible cause and repeats the operations discussed above with respect to the newly selected cause. That is to say, in particular embodiments, the cause module selects the next possible cause found in the hierarchical program structure and performs the operations discussed above on the selected possible cause as instructed by the structure.

However, if instead the cause module determines the likely cause of the party's issue has been identified, then the module returns the result to the module that invoked the cause module, such as the interactive module as previously discussed. In particular embodiments, the cause module may also provide a solution along with the cause.

Script Module

Figure 16:
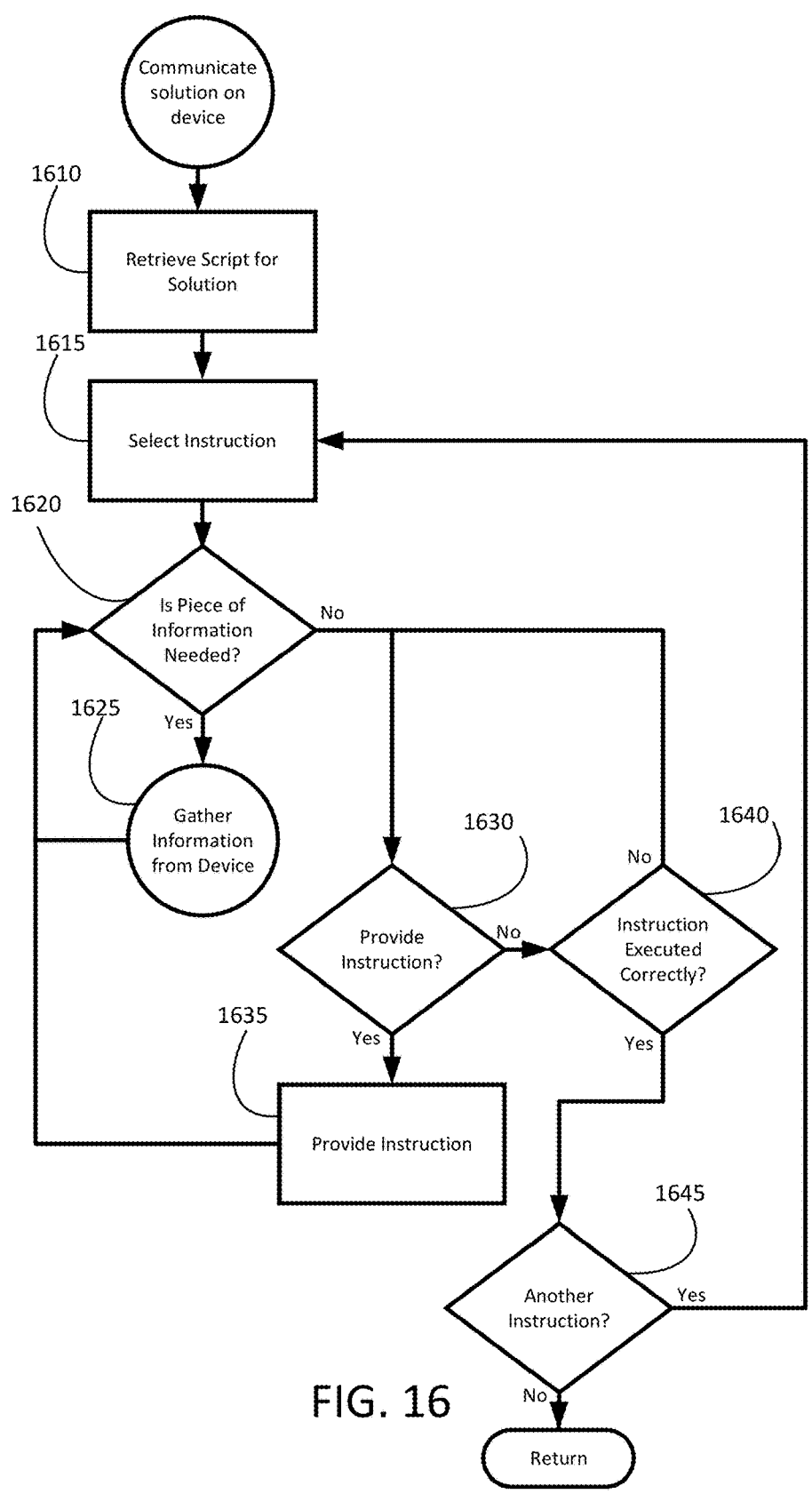
FIG. 16 illustrates a process flow for providing instructions to address a cause in accordance with various embodiments of the present invention.

Turning now to FIG. 16, additional details are provided regarding a process flow for providing instructions to a party to address the party's issue according to various embodiments of the invention. In particular, FIG. 16 is a flow diagram of a script module for performing such functionality according to various embodiments of the invention. For example, the flow diagram shown in FIG. 16 may correspond to operations carried out by one or more processors in one or more components, such as the interactive component 115 described above, as it executes the script module stored in the component's volatile and/or nonvolatile memory.

In particular embodiments, the script module is invoked by the interactive module (or some other module) to provide instructions to the party on the party's augmented reality device 110 on how to address the party's issue. Accordingly, the process flow begins with the script module retrieving a script to the party's issue in Operation 1610. Here, the script module may retrieve the script from some type of storage media 130 based on an identified solution to the party's issue. For example, the interactive module may have been provided with a solution to an identified cause of the party's issue and may have then provided this solution to the script module. At this point, the script module selects an instruction for the script in Operation 1615.

In various embodiments, the script is composed of instructions that are to be provided to the party to execute to attempt to address the party's issue. In addition, the script may include media that is executed on the party's augmented reality device 110 to aid the party in performing the instructions. Here, the term "executed" may refer to, for example, an image or video that is display to the party and/or a sound that is played for the party to hear. For instance, in the example, the instruction may involve having the party wind the rear barrel adjuster located on the rear derailleur. Here, the script may involve displaying the instruction along with some type of identifier (e.g., an arrow) pointing out the rear barrel adjuster on the party's rear derailleur to help the party locate the barrel adjuster on his or her bike.

Accordingly, the script module determines in Operation 1620 if a piece of information is needed to execute the instruction and/or any accompanying media on the party's augmented reality device 110. Therefore, in the example, the script module needs to identify where the party's actual rear derailleur is located in the party's field of view through the party's augmented reality device 110 so that the identifier can be superimposed over the party's field of view in the correct location to point out the rear derailleur on the party's bike.

Thus, the script module determines in the example that information is needed to identify the location of the rear derailleur on the party's bike and goes about gather the information from the party's device 110 in Operation 1625. Here, the party may be asked to view his rear derailleur on his bike and an image of the party's view is provided. In turn, the script module (or some other module) may perform some type of object recognition on the image to identify the location of the rear derailleur in the image.

At this point, the script module determines whether to provide an instruction to the party in Operation 1630. If the determination is yes, then the script module provides the instruction to the party's augmented reality device 110 along with any corresponding media and location information for placing the instruction and/or media on the display of the party's augmented reality device 110 in Operation 1635. Thus, in the example, the script module provides the party's augmented reality device 110 with the instruction to have the party wind the rear barrel adjuster located on the rear derailleur along with the identifier to point out the rear derailleur on the party's bike and location information on where to superimpose the instruction and identifier on the display of the party's augmented reality device 110.

Figure 17:
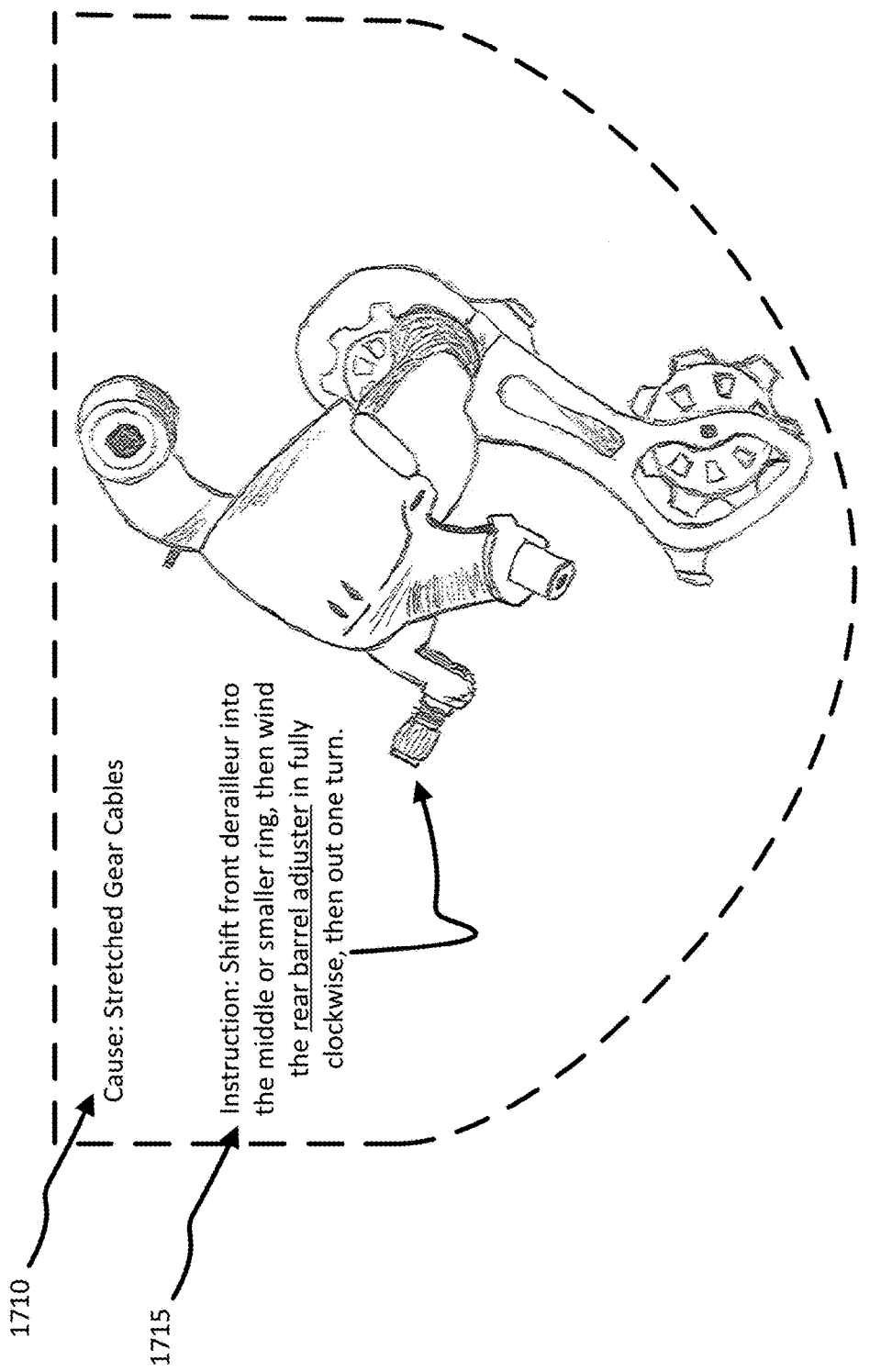
FIG. 17 is a fourth example view of one lens of an augmented reality device from the perspective of a wearer of the device resulting from practicing various embodiments of the present invention.

For instance, turning briefly to FIG. 17, the script module may have instructed the party's augmented reality device 110 to superimpose the identified cause 1710 of the party's issue on the display of the party's augmented reality device 110 in upper left-hand corner. In addition, script module may have instructed the party's augmented reality device 110 to superimpose the instruction 1715 along with an identifier (e.g., a line and arrow) pointing out the rear barrel adjuster to the party on the rear derailleur of the party's bike. Here, the script module may instruct the party's augmented reality device 110 (provide a location to the device 110) to display the instruction and identifier on the party's field of view in an appropriate location so that the identifier is pointing at the actual rear barrel adjuster on the party's bike.

Returning to FIG. 16, accordingly, the party goes about executing the instruction in an attempt to resolve his or her issue. In particular instances, a piece of information may need to be gathered as a result of the party executing the instruction. For example, the instruction may involve having the party shift the gearing on the bike to the smallest cog. Here, an image of the cassette may be taken so that a determination can be made that the instruction has been executed successfully. Again, in this example, some type of object recognition may be utilized in making such a determination.

Therefore, in Operation 1620, the script module determines whether a piece of information is needed. If so, then the script module in particular embodiments gathers the needed piece of information by invoking the information collecting module in Operation 1625. Once the information collecting module has completed gathering the information and returned to the script module, the script module then determines whether another piece of information is needed in Operation 1620. If so, then the script module goes about collecting the additional piece of information from the party and so forth. However, if script module determines another piece of information is not needed, then the script module determines whether an instruction is to be provided to the party in Operation 1630. Since the script module has already provided the instruction to the party in the example, the script module determines an instruction does not need to be provided to the party. Therefore, the script module determines whether the instruction was executed correctly in Operation 1640. Here, the term "correctly" is used to refer to the party performing the instruction in an identified manner as intended to bring about the solution associated with the script.

Again, depending on the circumstances, the script module may perform one or more actions in making a determination on whether the instruction has been executed correctly. For example, in particular instances, the script module may evaluate the answer to one or more questions asked of the party through the party's augmented reality device 110 to determine whether the party has executed the instruction correctly. While in other instances, the script module may evaluate one or more images and/or videos to determine whether the party has executed the instruction correctly. In some instructions, the script module may evaluate a combination of information such as, for example, an answer to a question and an image.

At this point, if the script module determines the instruction has not been executed correctly, then the script module returns to Operation 1630 and provides the party with the instruction again. Here, the script module may provide additional information along with the instruction to further help the party execute the instruction. However, if the script module determines the instruction has been executed correctly, then the script module determines whether another instruction from the script is to be provided to the party in Operation 1645. If so, then the script module returns to Operation 1615 and selects the next instruction. If instead the script module determines no further instructions exist for the script, then the script module ends and returns to the interactive module.

As already discussed, the interactive module, in turn, determines whether the execution of the script has resolved the party's issue. If not, then the interactive module goes about gathering further information in an attempt to identify another possible cause of the party's issue. However, if the issue has been resolved, then the augmented reality session with the party is normally ended.

Exemplary Processing Device Architecture

Figure 18:
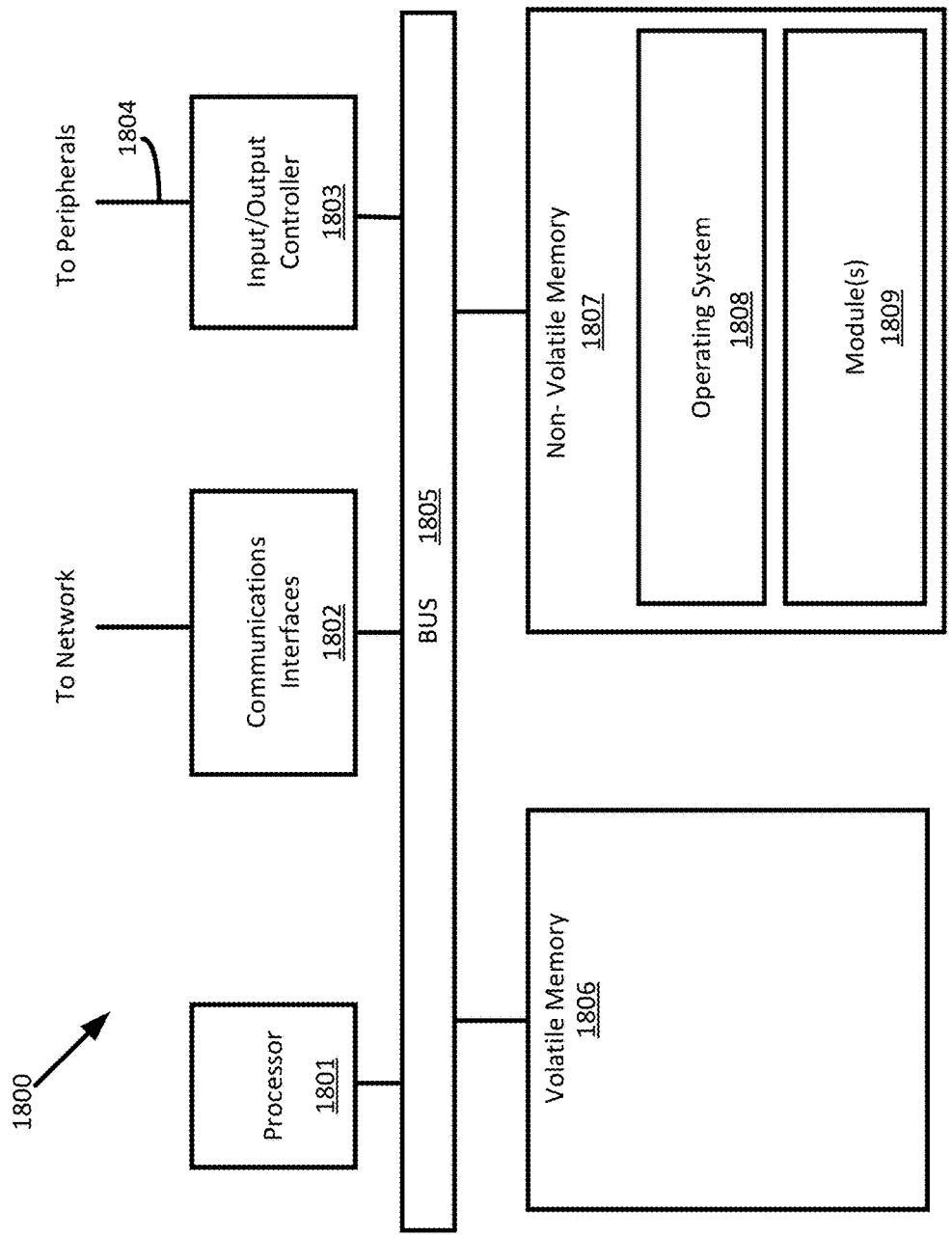
FIG. 18 is an exemplary schematic diagram of a processing component used in various embodiments of the system architecture to practice the technologies disclosed herein.

As discussed in conjunction with FIG. 1, the system architecture 100 may comprise various components. Accordingly, FIG. 18 is an exemplary schematic diagram of a processing component 1800 that may be used in various embodiments of the system architecture 100 to practice the technologies disclosed herein such as, for example, the interactive component 115 and/or the analytics component 120. In general, the term "processing component" may be exemplified by, for example, but without limitation: a various types of computers, servers, blades, gateways, switches, and the like, as well as any combination of devices or entities adapted to perform the functions described herein.

As shown in FIG. 18, the processing component 1800 may include one or more processors 1801 that may communicate with other elements within the processing component 1800 via a bus 1805. The processor 1801 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the processing component 1800 may also include one or more communication interfaces 1802 for communicating data via the local network with various external devices, such as other components of FIG. 1. Depending on the embodiment, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The processing component 1800 may further include an input/output controller 1803 that may communicate with one or more input devices or peripherals using an interface 1804, such as, but not limited to: a keyboard, a mouse, a touch screen/display input, microphone, pointing device, etc. The input/output controller 1803 may also communicate with output devices or peripherals, such as displays, printers, speakers, headsets, banner displays, etc.

The processor 1801 may be configured to execute instructions stored in volatile memory 1806, non-volatile memory 1807, or other forms of computer-readable storage media accessible to the processor 1801. The volatile memory 1806 may comprise various types of memory technologies, including, but not limited to: random access memory ("RAM"), dynamic random access memory ("DRAM"), static random access memory ("SRAM"), and other forms well known to those skilled in the art. The non-volatile memory 1807 may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 1807 may store program code and data, which also may be loaded into the volatile memory 1806 at execution time. Specifically, the non-volatile memory 707 may store one or more program modules 1809, such as the modules described above, containing instructions for performing the processes and/or functions associated with the technologies disclosed herein, and/or operating system code 1808. In addition, these program modules 1809 may also access, generate, or store data 1810, in the non-volatile memory 1807, as well as in the volatile memory 1806. The volatile memory 1806 and/or non-volatile memory 1807 may be used to store other information including, but not limited to: records, applications, programs, scripts, source code, object code, byte code, compiled code, interpreted code, machine code, executable instructions, or the like. These may be executed or processed by, for example, the processor 1801 and/or may form a part of, or may interact with, the program modules 1809.

The technologies described herein may be implemented in various ways, including as computer program products comprising memory storing instructions causing a processor to perform the operations associated with the above technologies. The computer program product may comprise a tangible non-transitory computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer readable storage media include all the above identified media (including volatile and non-volatile media), but does not include a transitory, propagating signal. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer-readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A method for providing support to a party who is using an augmented reality device and seeking to resolve an issue the party who is using the augmented reality device is seeking to resolve, the method comprising:

obtaining one or more pieces of information from the augmented reality device needed to identify a cause of the issue, the one or more pieces of information comprising at least one of (1) an image of a real world, physical object photographed by a camera coupled to the augmented reality device, (2) a video of the real world, physical object recorded by the camera coupled to the augmented reality device, (3) a physical sound recorded through a microphone on the augmented reality device, and (4) input provided by the party on an input element on the augmented reality device;

identifying the cause of the issue by utilizing one or more predictive models and at least one of the one or more pieces of information as input to the one or more predictive models, wherein the one or more predictive models are arranged in a hierarchical program structure of possible causes to provide an order in which the one or more predictive models are utilized for identifying the cause of the issue and identifying the cause of the issue involves systematically working through the possible causes by making use of the one or more predictive models along with the at least one of the one or more pieces of information as input to the one or more predictive models to determine a likelihood of each of one or more of the possible causes being the cause of the issue;

querying a script for the identified cause of the issue, the script comprising one or more instructions to be performed by the party and one or more pieces of media to execute on the augmented reality device to aid the party in performing the one or more instructions; and communicating the one or more instructions and the one or more pieces of media to the party through the augmented reality device.

2. The method of claim 1 comprising communicating location information to the augmented reality device, the location information identifying at least one of where to place one of the one or more instructions and one of the one or more pieces of media on a display of the augmented reality device so that the at least one of the one of the one or more instructions and the one of the one or more pieces of media are superimposed over a field of view of the party in one or more positions with respect to at least one physical object viewable in the field of view of the party.

3. The method of claim 1, wherein the one or more predictive models comprise one or more of a decision tree, a support vector machine, Bayesian network, clustering, reinforcement learning, and neural network.

4. The method of claim 1 further comprising requesting access to the augmented reality device so that certain aspects of the augmented reality device can be controlled to obtain the one or more pieces of information.

5. The method of claim 1, wherein the one or more instructions are communicated to the party one at a time and the method further comprises:
   determining whether an instruction from the one or more instructions communicated to the party was performed correctly by the party;
   in response to determining the instruction was not performed correctly by the party, communicating the instruction to the party again so that the party can re-perform the instruction correctly; and
   in response to determining the instruction was performed correctly by the party, communicating a next instruction from the one or more instructions to the party to perform.

6. The method of claim 1, wherein the one or more pieces of media comprise at least one of (1) an image to be displayed on a display of the augmented reality device, (2) a video to be displayed on the display of the augmented reality device, and (3) a sound to be played over a speaker coupled with the augmented reality device.

7. A non-transitory, computer-readable medium comprising computer-executable instructions for providing support to a party who is using an augmented reality device and seeking to resolve an issue the party who is using the augmented reality device is seeking to resolve, that when executed, cause at least one computer processor to:
   obtain one or more pieces of information from the augmented reality device needed to identify a cause of the issue, the one or more pieces of information comprising at least one of (1) an image of a real world, physical object photographed by a camera coupled to the augmented reality device, (2) a video of the real world, physical object recorded by the camera coupled to the augmented reality device, (3) a physical sound recorded through a microphone on the augmented reality device, and (4) input provided by the party on an input element on the augmented reality device;
   identify the cause of the issue by utilizing one or more predictive models and at least one of the one or more pieces of information as input to the one or more predictive models, wherein the one or more predictive models are arranged in a hierarchical program structure of possible causes to provide an order in which the one or more predictive models are utilized for identifying the cause of the issue and the computer-executable instructions cause the at least one computer process to identify the cause of the issue by systematically working through the possible causes by making use of the one or more predictive models along with the at least one of the one or more pieces of information as input to the one or more predictive models to determine a likelihood of each of one or more of the possible causes being the cause of the issue;
   query a script for the identified cause of the issue, the script comprising one or more instructions to be performed by the party and one or more pieces of media to execute on the augmented reality device to aid the party in performing the one or more instructions; and
   communicate the one or more instructions and the one or more pieces of media to the party through the augmented reality device.

8. The non-transitory, computer-readable medium of claim 7, wherein the computer-executable instructions cause the at least one computer processor to communicate location information to the augmented reality device, the location information identifying at least one of where to place one of the one or more instructions and one of the one or more pieces of media on a display of the augmented reality device so that the at least one of the one of the one or more instructions and the one of the one or more pieces of media are superimposed over a field of view of the party in one or more positions with respect to at least one physical object viewable in the field of view of the party.

9. The non-transitory, computer-readable medium of claim 7, wherein the one or more predictive models comprise one or more of a decision tree, a support vector machine, Bayesian network, clustering, reinforcement learning, and neural network.

10. The non-transitory, computer-readable medium of claim 7, wherein the computer-executable instructions cause the at least one computer processor to request access to the augmented reality device so that the at least one computer processor is able to control certain aspects of the augmented reality device to obtain the one or more pieces of information.

11. The non-transitory, computer-readable medium of claim 7, wherein the one or more instructions are communicated to the party one at a time and the computer-executable instructions cause the at least one computer processor to:
   determine whether an instruction from the one or more instructions communicated to the party was performed correctly by the party;
   in response to determining the instruction was not performed correctly by the party, communicate the instruction to the party again so that the party can re-perform the instruction correctly; and
   in response to determining the instruction was performed correctly by the party, communicate a next instruction from the one or more instructions to the party to perform.

12. The non-transitory, computer-readable medium of claim 7, wherein the one or more pieces of media comprise at least one of (1) an image to be displayed on a display of the augmented reality device, (2) a video to be displayed on the display of the augmented reality device, and (3) a sound to be played over a speaker coupled with the augmented reality device.

13. A system for providing support to a party who is using an augmented reality device and seeking to resolve an issue the party who is using the augmented reality device is seeking to resolve, the system comprising:
at least one computer processor configured to:
obtain one or more pieces of information from the augmented reality device needed to identify a cause of the issue, the one or more pieces of information comprising at least one of (1) an image of a real world, physical object photographed by a camera coupled to the augmented reality device, (2) a video of the real world, physical object recorded by the camera coupled to the augmented reality device, (3) a physical sound recorded through a microphone on the augmented reality device, and (4) input provided by the party on an input element on the augmented reality device;
identify the cause of the issue by utilizing one or more predictive models and at least one of the one or more pieces of information as input to the one or more predictive models, wherein the one or more predictive models are arranged in a hierarchical program structure of possible causes to provide an order in which the one or more predictive models are utilized for identifying the cause of the issue and the at least one computer process is configured to identify the cause of the issue by systematically working through the possible causes by making use of the one or more predictive models along with the at least one of the one or more pieces of information as input to the one or more predictive models to determine a likelihood of each of one or more of the possible causes being the cause of the issue;
query a script for the identified cause of the issue, the script comprising one or more instructions to be performed by the party and one or more pieces of media to execute on the augmented reality device to aid the party in performing the one or more instructions; and
communicate the one or more instructions and the one or more pieces of media to the party through the augmented reality device.

14. The system of claim 13, wherein the at least one computer processor is configured to communicate location information to the augmented reality device, the location information identifying at least one of where to place one of the one or more instructions and one of the one or more pieces of media on a display of the augmented reality device so that the at least one of the one of the one or more instructions and the one of the one or more pieces of media are superimposed over a field of view of the party in one or more positions with respect to at least one physical object viewable in the field of view of the party.

15. The system of claim 13, wherein the one or more predictive models comprise one or more of a decision tree, a support vector machine, Bayesian network, clustering, reinforcement learning, and neural network.

16. The system of claim 13, wherein the at least one computer processor is configured to request access to the augmented reality device so that the at least one computer processor is able to control certain aspects of the augmented reality device to obtain the one or more pieces of information.

17. The system of claim 13, wherein the one or more instructions are communicated to the party one at a time and the at least one computer processor is configured to:
determine whether an instruction from the one or more instructions communicated to the party was performed correctly by the party;
in response to determining the instruction was not performed correctly by the party, communicate the instruction to the party again so that the party can re-perform the instruction correctly; and
in response to determining the instruction was performed correctly by the party, communicate a next instruction from the one or more instructions to the party to perform.

18. The system of claim 13, wherein the one or more pieces of media comprise at least one of (1) an image to be displayed on a display of the augmented reality device, (2) a video to be displayed on the display of the augmented reality device, and (3) a sound to be played over a speaker coupled with the augmented reality device.

* * * * *